(12) United States Patent
Xue et al.

(10) Patent No.: US 12,015,982 B2
(45) Date of Patent: Jun. 18, 2024

(54) COMMUNICATIONS METHOD AND APPARATUS

(71) Applicant: Huawei Technologies Co., Ltd., Shenzhen (CN)

(72) Inventors: Yifan Xue, Beijing (CN); Jian Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 425 days.

(21) Appl. No.: 17/418,114

(22) PCT Filed: Dec. 26, 2019

(86) PCT No.: PCT/CN2019/128849
§ 371 (c)(1),
(2) Date: Jun. 24, 2021

(87) PCT Pub. No.: WO2020/135629
PCT Pub. Date: Jul. 2, 2020

(65) Prior Publication Data
US 2022/0110059 A1 Apr. 7, 2022

(30) Foreign Application Priority Data
Dec. 26, 2018 (CN) .......................... 201811600113.X

(51) Int. Cl.
*H04W 52/02* (2009.01)
(52) U.S. Cl.
CPC ............... *H04W 52/0235* (2013.01)
(58) Field of Classification Search
CPC ................................. H04W 52/0235
(Continued)

(56) References Cited

U.S. PATENT DOCUMENTS

2009/0270030 A1* 10/2009 Jia ....................... H04B 1/1615
455/39
2011/0128901 A1 6/2011 Lee et al.
(Continued)

FOREIGN PATENT DOCUMENTS

| CN | 102098735 A | 6/2011 |
|---|---|---|
| CN | 102113290 A | 6/2011 |

(Continued)

OTHER PUBLICATIONS

R1-1611213, Huawei, et al., "Signalling design for UL control resource in NR," 3GPP TSG RAN WG1 Meeting #87, Reno, USA, Nov. 14-18, 2016, 4 pages.

(Continued)

*Primary Examiner* — Nghi H Ly
(74) *Attorney, Agent, or Firm* — Conley Rose, P.C.

(57) ABSTRACT

A terminal receives a power saving signal sent by a network device, where the power saving signal indicates N time units, and where N is greater than 0. The terminal determines a state of the terminal in a first time period corresponding to the N time units on a first frequency domain resource and a state in a second time period corresponding to the N time units on a second frequency domain resource. The state of the terminal includes a sleep state or a wake-up state. The sleep state indicates that the terminal monitors no first signal, and the wake-up state indicates that the terminal monitors a first signal based on a configuration parameter.

20 Claims, 11 Drawing Sheets

(58) Field of Classification Search
USPC .............. 370/329, 328, 338, 341, 345, 350
See application file for complete search history.

(56) References Cited

U.S. PATENT DOCUMENTS

| | | |
|---|---|---|
| 2014/0119253 A1 | 5/2014 | Weng et al. |
| 2015/0271755 A1 | 9/2015 | Karri et al. |
| 2015/0365964 A1 | 12/2015 | Jiang et al. |
| 2017/0202052 A1 | 7/2017 | Xu et al. |
| 2017/0290008 A1 | 10/2017 | Tooher et al. |
| 2018/0092039 A1 | 3/2018 | Cariou et al. |
| 2019/0327756 A1 | 10/2019 | Guan et al. |
| 2020/0163066 A1 | 5/2020 | Jiang |
| 2020/0257436 A1 | 8/2020 | Yun et al. |

FOREIGN PATENT DOCUMENTS

| | | |
|---|---|---|
| CN | 104811965 A | 7/2015 |
| CN | 105142238 A | 12/2015 |
| CN | 105323841 A | 2/2016 |
| CN | 107155212 A | 9/2017 |
| CN | 108282875 A | 7/2018 |
| CN | 108738113 A | 11/2018 |

OTHER PUBLICATIONS

Qualcomm Incorporated,"Further discussion on Wake-up signal functions", 3GPP TSG RAN WG1 Meeting #92bis, R1-1804918, Sanya, China, Apr. 16-20, 2018, total 7 pages.

Qualcomm Incorporated,"Views on UE power saving", 3GPP TSG RAN WG1 Meeting #94, R1-1809462, Gothenburg, Sweden, Aug. 20-24, 2018, total 11 pages.

Huawei et al,"General considerations on UE power saving in Rel-16", 3GPP TSG RAN WG1 Meeting #94, R1-1809333, Gothenburg, Sweden, Aug. 20-24, 2018, total 5 pages.

InterDigital, Inc., "Discussion on Power Saving Techniques", 3GPP TSG RAN WG1 Meeting #95, R1-1813243, Spokane, USA, Nov. 12-16, 2018, total 5 pages.

MediaTek Inc.,"Triggering adaptation for UE power saving", 3GPP TSG RAN WG1 Meeting #95, R1-1812362, Spokane, USA, Nov. 12-16, 2018, total 12 pages.

CATT,"UE Power saving schemes with power saving signal/channel/procedures", 3GPP TSG RAN WG1 Meeting #95, R1-1812642, Spokane, USA, Nov. 12-16, 2018, total 10 pages.

\* cited by examiner

COMMUNICATIONS METHOD AND APPARATUS

CROSS-REFERENCE TO RELATED APPLICATIONS

This is a U.S. National Stage of International Patent Application No. PCT/CN2019/128849 filed on Dec. 26, 2019, which claims priority to Chinese Patent Application No. 201811600113.X filed on Dec. 26, 2018, both of which are hereby incorporated by reference in their entireties.

TECHNICAL FIELD

This application relates to the field of communications technologies, and in particular, to a communications method and apparatus.

BACKGROUND

A standby tune of a terminal significantly affects user experience. Because a 5G new radio (new radio, NR) system needs to support a larger bandwidth, a higher transmission rate, and wider coverage than a long term evolution (long term evolution, LTE) system, power consumption of an NR terminal is higher than power consumption of an LIE terminal. To ensure good user experience, the 3rd generation partnership project (3rd generation partnership project, 3GPP) has initiated a special project for a power saving subject of a terminal in Rel-16 to study an optimization solution for reducing power consumption of the terminal.

To achieve energy saving, optimization may be performed from two aspects: 1. Improve data transmission efficiency when there is a service load (that is, data needs to be transmitted); and 2, reduce energy consumption when there is no service load. For the second point, a report of the international telecommunication union-radio communications sector (international telecommunication union-radio communications sector, ITU-R) states that energy consumption can be reduced by increasing a proportion of a sleep state of a terminal.

SUMMARY

Embodiments of this application provide a communications method, so that a terminal determines sleep time or wake-up time on different frequency domain resources based on one power saving signal.

According to a first aspect, an embodiment of this application provides a communications method, including:

A network device sends a power saving signal to a terminal, where the power saving signal indicates N time units, and N is an integer greater than 0; and after receiving the power saving signal, the terminal determines a state of the terminal in a first time period corresponding to the N time units on a first frequency domain resource and a state in a second time period corresponding to the N time units on a second frequency domain resource. The state is a sleep state or a wake-up state, the sleep state indicates that the terminal monitors no first signal, and the wake-up state indicates that the terminal monitors a first signal based on a configuration parameter.

In the foregoing embodiment, after receiving the power saving signal, the terminal determines a time period corresponding to the N time units indicated by the signal on different frequency domain resources, instead of simply determining that sleep time or wake-up time on different frequency domain resources are the N time units. Because states of the terminal on different frequency domain resources are closely synchronized, this helps save power.

In a possible implementation, absolute duration of the first time period on the first frequency domain resource may be made to be equal to or approximately equal to absolute duration of the N time units, and absolute duration of the second time period on the second frequency domain resource may be made to be equal to or approximately equal to the absolute duration of the N time units.

In a possible implementation, the time unit indicated by the power saving signal is a slot, and duration of the first time period is N slots on the first frequency domain resource. The terminal determines duration of the second time period based on a sub-carrier spacing configured for the first frequency domain resource, a sub-carrier spacing configured for the second frequency domain resource, and N. In this embodiment, N slots indicated by the network device by using the first frequency domain resource as a reference are N slots on the first frequency domain resource. The terminal further determines the duration of the second time period corresponding to the N slots on the first frequency domain resource.

In a possible implementation, absolute duration of the N slots on the first frequency domain resource may be determined, and a quantity of slots equal to or approximately equal to the absolute duration on the second frequency domain resource may be determined.

In a possible implementation, the sub-carrier spacing configured for the first frequency domain resource is 15*2M1 kHz, and the sub-carrier spacing configured for the second frequency domain resource is 15*2M2 kHz, where M1 and M2 are integers greater than or equal to 0. The terminal determines that the duration of the second time period is N*2M2−M1 slots, or $\lfloor N*2^{M2-M1} \rfloor$ slots, or $\lceil N*2^{M2-M1} \rceil$ slots on the second frequency domain resource. Further, making M2≥M1, the duration of the second time period may be an integer quantity of slots, thereby avoiding a case of a non-integer quantity of slots, and facilitating operation of the terminal.

In a possible implementation, the terminal determines the duration of the second time period through table lookup based on the sub-carrier spacing of the first frequency domain resource, the sub-carrier spacing of the second frequency domain resource, and N.

In a possible implementation, the time unit indicated by the power saving signal is a slot. The method further includes: The network device sends first configuration information to the terminal before sending the power saving signal, where the first configuration information includes a reference sub-carrier spacing of the power saving signal. The terminal determines the duration of the first time period based on the reference sub-carrier spacing, the sub-carrier spacing of the first frequency domain resource, and the N time units, and determines the duration of the second time period based on the reference sub-carrier spacing, the sub-carrier spacing of the second frequency domain resource, and the N time units.

In a possible implementation, absolute duration of the N slots in a case of the reference sub-carrier spacing may be determined, a quantity of slots equal to or approximately equal to the absolute duration on the first frequency domain resource may be determined, and a quantity of slots equal to or approximately equal to the absolute duration on the second frequency domain resource may be determined.

In a possible implementation, the reference sub-carrier spacing is 15*2M0 kHz, the sub-carrier spacing configured for the first frequency domain resource is 15*M1 kHz, and the sub-carrier spacing configured for the second frequency domain resource is 15*2M2 kHz. The terminal determines that the duration of the first time period is N*2M1−M0 slots, or $\lfloor N*2^{M1-M0} \rfloor$ slots, or $\lceil N+2^{M1-M0} \rceil$ slots on the first frequency domain resource; and that the duration of the second time period is N*2M2−M0 slots, or $\lfloor N*2^{M2-M0} \rfloor$ slots, or $\lceil N*2^{M2-M0} \rceil$ slots on the second frequency domain resource. Further, making M1≤M0 and M2≥M0, the duration of the first time period and the duration of the second time period may be an integer quantity of slots, thereby avoiding a case of a non-integer quantity of slots, and facilitating operation of the terminal.

In a possible implementation, if the duration of the first time period is a non-integer quantity of slots and/or the duration of the second time period is a non-integer quantity of slots, the terminal reports an error to the network device. The terminal may not expect the duration of the first time period and the second time period to be a non-integer quantity of slots. Therefore, if the terminal determines that the duration of the first time period and/or the second time period is a non-integer quantity of slots, the terminal does not perform a corresponding sleep or wake-up operation, but reports an error to the network device. Correspondingly, the network device may alternatively pre-estimate the duration of the first time period and the second time period, so that the first time period and the second time period corresponding to the N time units are an integer quantity of slots as far as possible.

In a possible implementation, the terminal determines the duration of the first time period through table lookup based on the reference sub-carrier spacing, the sub-carrier spacing of the first frequency domain resource, and N; and determines the duration of the second time period through table lookup based on the reference sub-carrier spacing, the sub-carrier spacing of the second frequency domain resource, and N.

In a possible implementation, a start time of the first time period is the first slot on the first frequency domain resource after the power saving signal is received, and a start time of the second time period is the first slot on the second frequency domain resource after the power saving signal is received. Alternatively, a start time of the first time period is a slot on the first frequency domain resource when the power saving signal is received, and a start time of the second time period is a slot on the second frequency domain resource when the power saving signal is received.

In a possible implementation, the first time period and the second time period include consecutive slots.

In a possible implementation, the time unit indicated by the power saving signal is a monitoring occasion. Because when monitoring the first signal based on the configuration parameter, the terminal may not continuously monitor the first signal. For example, the terminal monitors the first signal on the first symbol or the first several symbols in each slot, or monitors the first signal on the first several symbols in every two slots. A moment at which the first signal is monitored in a monitoring cycle is referred to as a monitoring occasion.

Duration of the first time period is N monitoring cycles or N*L1 slots on the first frequency domain resource, where L indicates that a monitoring cycle of the terminal on the first frequency domain resource is L1 slots, and L1 is an integer greater than or equal to 1. N monitoring occasions indicated by the network device by using the first frequency domain resource as a reference are N monitoring occasions on the first frequency domain resource. In a monitoring cycle, the terminal monitors the first signal on the monitoring occasion, and does not monitor the first signal in another time period. Therefore, if the network device indicates the terminal not to monitor the first signal on a next monitoring occasion, the terminal does not monitor the first signal in a next monitoring cycle. Therefore, if the network device indicates the terminal not to monitor the first signal on the N monitoring occasions, the terminal does not monitor the first signal in the N monitoring cycles.

In a possible implementation, absolute duration of the N monitoring cycles on the first frequency domain resource may be determined, and a quantity of monitoring cycles equal to or approximately equal to the absolute duration on the second frequency domain resource may be determined.

In a possible implementation, the sub-carrier spacing configured for the first frequency domain resource is 15*2M1 kHz, the sub-carrier spacing configured for the second frequency domain resource is 15*2M2 kHz, and a monitoring cycle of the terminal on the second frequency domain resource is L2 slots, where M1 and M2 are integers greater than or equal to 0, and L2 is an integer greater than or equal to 1. Duration of the second time period is $$\frac{N*L1*2^{M2-M1}}{L2}$$

monitoring cycles, or $$\left\lfloor \frac{N*L1*2^{M2-M1}}{L2} \right\rfloor$$

monitoring cycles, or $$\left\lceil \frac{N*L1*2^{M2-M1}}{L2} \right\rceil$$

monitoring cycles, or $N*L1*2^{M2-M1}$ slots, or $$L2*\left\lfloor \frac{N*L1*2^{M2-M1}}{L2} \right\rfloor$$

slots, or $$L2*\left\lceil \frac{N*L1*2^{M2-M1}}{L2} \right\rceil$$

slots on the second frequency domain resource. Further, making M2≥M1, the duration of the second time period may be an integer quantity of slots, thereby avoiding a case of a non-integer quantity of slots, and facilitating operation of the terminal.

In a possible implementation, the terminal may determine the duration of the second time period through table lookup based on the sub-carrier spacing of the first frequency domain resource, the monitoring cycle on the first frequency domain resource, the sub-carrier spacing of the second frequency domain resource, the monitoring cycle on the second frequency domain resource, and N.

In a possible implementation, the time unit indicated by the power saving signal is a monitoring occasion. The method further includes: The network device sends second configuration information to the terminal before sending the power saving signal, where the second configuration information includes a reference sub-carrier spacing and a reference monitoring cycle of the power saving signal. The terminal determines duration of the first time period based on the reference sub-carrier spacing, the sub-carrier spacing of the first frequency domain resource, the reference monitoring cycle, the monitoring cycle of the terminal on the first frequency domain resource, and N; and determines duration of the second time period based on the reference sub-carrier spacing, the sub-carrier spacing of the second frequency domain resource, the reference monitoring cycle, the monitoring cycle of the terminal on the second frequency domain resource, and N.

In a possible implementation, absolute duration of the N monitoring cycles in a case of the reference sub-carrier spacing and the reference monitoring cycle may be determined, a quantity of monitoring cycles equal to or approximately equal to the absolute duration on the first frequency domain resource may be determined, and a quantity of monitoring cycles equal to or approximately equal to the absolute duration on the second frequency domain resource may be determined.

In a possible implementation, the reference sub-carrier spacing is 15*2M0 kHz, and the reference monitoring cycle is L0 slots, where M0 is an integer greater than or equal to 0, and L0 is an integer greater than or equal to 1. The sub-carrier spacing configured for the first frequency domain resource is 15*2M1 kHz, the sub-carrier spacing configured for the second frequency domain resource is 15*2M2 kHz, the monitoring cycle of the terminal on the first frequency domain resource is L1 slots, and the monitoring cycle of the terminal on the second frequency domain resource is L2 slots, where M1 and M2 are integers greater than or equal to 0, and L1 and L2 are integers greater than or equal to 1. The duration of the first time period determined by the terminal is $$\frac{N*L0*2^{M1-M0}}{L1}$$

monitoring cycles, or $$\left\lfloor \frac{N*L0*2^{M1-M0}}{L1} \right\rfloor$$

monitoring cycles, or $$\left\lceil \frac{N*L0*2^{M1-M0}}{L1} \right\rceil$$

monitoring cycles, or $N+L0*2^{M1-M0}$ slots, or $$L1*\left\lfloor \frac{N*L0*2^{M1-M0}}{L1} \right\rfloor$$

slots, or $$L1*\left\lceil \frac{N*L0*2^{M1-M0}}{L1} \right\rceil$$

slots on the first frequency domain resource; and the determined duration of the second time period is $$\frac{N*L0*2^{M2-M0}}{L2}$$

monitoring cycles, or $$\left\lfloor \frac{N*L0*2^{M2-M0}}{L2} \right\rfloor$$

monitoring cycles, or $$\left\lceil \frac{N*L0*2^{M2-M0}}{L2} \right\rceil$$

monitoring cycles, or $N*L0*2^{M2-M0}$ slots, or $$L2*\left\lfloor \frac{N*L0*2^{M2-M0}}{L2} \right\rfloor$$

slots, or $$L2*\left\lceil \frac{N*L0*2^{M2-M0}}{L2} \right\rceil$$

slots on the second frequency domain resource. Further, making M1≥M0 and M2≥M0, the duration of the first time period and the duration of the second time period may be an integer quantity of slots, thereby avoiding a case of a non-integer quantity of slots, and facilitating operation of the terminal.

In a possible implementation, if the first time period is a non-integer quantity of monitoring cycles and/or the second time period is a non-integer quantity of monitoring cycles, the terminal reports an error to the network device. The terminal may not expect the duration of the first time period and the second time period to be a non-integer quantity of monitoring cycles. Therefore, if the terminal determines that the duration of the first time period and/or the second time period is a non-integer quantity of monitoring cycles, the terminal does not perform a corresponding sleep or wake-up operation, but reports an error to the network device. Correspondingly, the network device may alternatively pre-estimate the duration of the first time period and the second time period, so that the first time period and the second time period corresponding to the N time units are an integer quantity of monitoring cycles as far as possible.

In a possible implementation, the terminal may determine the duration of the first time period through table lookup based on the reference sub-carrier spacing, the sub-carrier spacing of the first frequency domain resource, the reference monitoring cycle, the monitoring cycle of the terminal on the first frequency domain resource, and N; and determine the duration of the second time period through table lookup based on the reference sub-carrier spacing, the sub-carrier spacing of the second frequency domain resource, the reference monitoring cycle, the monitoring cycle of the terminal on the second frequency domain resource, and N.

In a possible implementation, a start time of the first time period is the first monitoring occasion on the first frequency domain resource after the power saving signal is received, and a start time of the second time period is the first monitoring occasion on the second frequency domain resource after the power saving signal is received. Alternatively, a start time of the first time period is the first slot on the first frequency domain resource after the power saving signal is received, and a start time of the second tune period is the first slot on the second frequency domain resource after the power saving signal is received. Alternatively, a start time of the first time period is a slot on the first frequency domain resource when the power saving signal is received, and a start time of the second time period is a slot on the second frequency domain resource when the power saving signal is received.

In a possible implementation, the time unit indicated by the power saving signal is a connected-discontinuous reception (connected-discontinuous reception. C-DRX) cycle, and a C-DRX cycle configured for the first frequency domain resource is K1 absolute time units, where K1 is an integer greater than or equal to 1. Duration of the first time period determined by the terminal is N C-DRX cycles or N*K1 absolute time units on the first frequency domain resource. The terminal determines duration of the second time period based on a C-DRX cycle configured for the terminal on the first frequency domain resource, a C-DRX cycle configured for the terminal on the second frequency domain resource, and N. The absolute time unit may be millisecond (ms), second (s), or the like.

In a possible implementation, absolute duration of the N C-DRX cycles on the first frequency domain resource may be determined, and a quantity of C-DRX cycles equal to or approximately equal to the absolute duration on the second frequency domain resource may be determined.

In a possible implementation, a C-DRX cycle configured for the second frequency domain resource is K2 absolute time units, where K2 is an integer greater than or equal to 1. The duration of the second time period is N*K1/K2 C-DRX cycles or N*K1 absolute time units on the second frequency domain resource.

In a possible implementation, the terminal may determine the duration of the second time period through table lookup based on the C-DRX cycle on the first frequency domain resource, the C-DRX cycle on the second frequency domain resource, and N.

In a possible implementation, the time unit indicated by the power saving signal is a C-DRX cycle. The method further includes: The network device sends third configuration information to the terminal before sending the power saving signal to the terminal, where the third configuration information indicates that a reference C-DRX cycle of the power saving signal is K0 absolute time units. The terminal determines duration of the first time period based on the reference C-DRX cycle, the C-DRX cycle configured for the terminal on the first frequency domain resource, and N; and the terminal determines duration of the second time period based on the reference C-DRX cycle, the C-DRX cycle configured for the terminal on the second frequency domain resource, and N.

In a possible implementation, absolute duration of the N C-DRX cycles may be determined in a case of the reference C-DRX cycle, a quantity of C-DRX cycles equal to or approximately equal to the absolute duration on the first frequency domain resource may be determined, and a quantity of C-DRX cycles equal to or approximately equal to the absolute duration on the second frequency domain resource may be determined.

In a possible implementation, the C-DRX cycle configured for the first frequency domain resource is K1 absolute time units, and the C-DRX cycle configured for the second frequency domain resource is K2 absolute time units, where K1 and K2 are integers greater than or equal to 1. The duration of the first time period determined by the terminal is N*K0/K1 C-DRX cycles or N*K0 absolute time units on the first frequency domain resource; and the duration of the second time period is N*K0/K2 C-DRX cycles or N*K0 absolute time units on the second frequency domain resource.

In a possible implementation, if the first time period is a non-integer quantity of C-DRX cycles and/or the second time period is a non-integer quantity of C-DRX cycles, the terminal reports an error to the network device. The terminal may not expect the duration of the first time period and the second time period to be a non-integer quantity of C-DRX cycles. Therefore, if the terminal determines that the duration of the first time period and/or the second time period is a non-integer quantity of C-DRX cycles, the terminal does not perform a corresponding sleep or wake-up operation, but reports an error to the network device. Correspondingly, the network device may alternatively pre-estimate the duration of the first time period and the second time period, so that the first time period and the second time period corresponding to the N time units are an integer quantity of C-DRX cycles as far as possible.

In a possible implementation, the terminal may determine the duration of the first time period through table lookup based on the reference C-DRX cycle, the C-DRX cycle on the first frequency domain resource, and N. The terminal may determine the duration of the second time period through table lookup based on the reference C-DRX cycle, the C-DRX cycle on the second frequency domain resource, and N.

In a possible implementation, a start time of the first time period is a start time of a next C-DRX on the first frequency domain resource after the power saving signal is received, and a start time of the second time period is a start time of a next C-DRX on the second frequency domain resource after the power saving signal is received.

In a possible implementation, the network device sends the power saving signal to the terminal on the first frequency domain resource, and correspondingly, the terminal receives the power saving signal on the first frequency domain resource.

In a possible implementation, the first frequency domain resource is a first carrier, and the second frequency domain resource is a second carrier; or the first frequency domain resource is a first bandwidth part (bandwidth part, BWP), and the second frequency domain resource is a second BWP.

In a possible implementation, the first BWP is a primary BWP or a BWP on a primary carrier.

In a possible implementation, the first signal is one or more of the following signals: a PDCCH a channel state information reference signal (channel state information reference signal, CSI-RS), and a synchronization signal block (synchronization signal block, SSB).

In a possible implementation, the power saving signal is sent to the terminal by using downlink control information (downlink control information, DCI), and the DCI includes scheduling information used to schedule uplink data or downlink data. A start time of the first time period is a slot in which the power saving signal is received, or the first symbol or the first slot after the last symbol of downlink data is received, or the first symbol or the first slot after the terminal sends an ACK/NACK, or the first symbol or the first slot after the terminal sends an ACK/NACK and waits for preset duration within which the terminal does not receive the scheduling information of the network device, or a slot in which the power saving signal is received, or the first symbol or the first slot after the last symbol of uplink data is sent, or the first symbol or the first slot after the terminal sends uplink data and waits for first preset duration within which the terminal does not receive the scheduling information of the network device.

In a possible implementation, the preset duration is configured for the terminal by the network device.

According to a second aspect, an embodiment of this application provides a communications method, including:

A network device sends a power saving signal to a terminal, where the power saving signal indicates N time units, and N is an integer greater than 0; and after receiving the power saving signal, the terminal determines a state of the terminal m a first time period corresponding to the N time units on a first frequency domain resource and a state in a second time period corresponding to the N time units on a second frequency domain resource. The state is a sleep state or a wake-up state, the sleep state indicates that the terminal performs no measurement, and the wake-up state indicates that the terminal performs measurement based on a configuration parameter.

Manners for determining the duration of the first time period, the duration of the second time period, and the start time is similar to the implementations in the first aspect. Details are not described herein again.

According to a third aspect, an embodiment of this application further provides a communications device, including a receiving unit and a processing unit.

The receiving unit is configured to receive a power saving signal sent by a network device, where the power saving signal indicates N time units, and N is an integer greater than 0.

The processing unit is configured to determine, based on the power saving signal, a state of the communications device in a first time period corresponding to the N time units on a first frequency domain resource and a state in a second time period corresponding to the N time units on a second frequency domain resource. The state is a sleep state or a wake-up state, the sleep state indicates that the communications device monitors no first signal, and the wake-up state indicates that the communications device monitors a first signal based on a configuration parameter.

In a possible implementation, the time unit is a slot. Duration of the first time period is N slots on the first frequency domain resource; and duration of the second time period is determined based on a sub-carrier spacing configured for the first frequency domain resource, a sub-carrier spacing configured for the second frequency domain resource, and the N time units.

In a possible implementation, the sub-carrier spacing configured for the first frequency domain resource is $15*2^{M1}$ kHz, and the sub-carrier spacing configured for the second frequency domain resource is $15*2^{M2}$ kHz, where M1 and M2 are integers greater than or equal to 0. The duration of the second time period is $N*2^{M2-M1}$ slots, or $\lfloor N*2^{M2-M1} \rfloor$ slots, or $\lceil N*2^{M2-M1} \rceil$ slots on the second frequency domain resource.

In a possible implementation, the time unit is a slot. The receiving unit is further configured to: before receiving the power saving signal sent by the network device, receive first configuration information sent by the network device, where the first configuration information includes a reference sub-carrier spacing of the power saving signal.

The processing unit is specifically configured to: determine the duration of the first time period based on the reference sub-carrier spacing, the sub-carrier spacing configured for the first frequency domain resource, and the N time units; and determine the duration of the second time period based on the reference sub-carrier spacing, the sub-carrier spacing configured for the second frequency domain resource, and the N time units.

In a possible implementation, the reference sub-carrier spacing is $15*2^{M0}$ kHz, the sub-carrier spacing configured for the first frequency domain resource is $15*2^{M1}$ kHz, and the sub-carrier spacing configured for the second frequency domain resource is $15*2^{M2}$ kHz. The duration of the first time period is $N*2^{M1-M0}$ slots, or $\lfloor N*2^{M1-M0} \rfloor$ slots, or $\lceil N*2^{M1-M0} \rceil$ slots on the first frequency domain resource; and the duration of the second time period is $N*2^{M2-M0}$ slots, or $\lfloor N*2^{M2-M0} \rfloor$ slots, or $\lceil N+2^{M2-M0} \rceil$ slots on the second frequency domain resource.

In a possible implementation, the time unit is a monitoring occasion. Duration of the first time period is N monitoring cycles or N*L1 slots on the first frequency domain resource, where L indicates that a monitoring cycle of the communications device on the first frequency domain resource is L1 slots, and L1 is an integer greater than or equal to 1. Duration of the second time period is determined based on the sub-carrier spacing configured for the first frequency domain resource, the sub-carrier spacing configured for the second frequency domain resource, the monitoring cycle of the communications device on the first frequency domain resource, a monitoring cycle of the communications device on the second frequency domain resource, and the N time units.

In a possible implementation, the sub-carrier spacing configured for the first frequency domain resource is $15*2^{M1}$ kHz, the sub-carrier spacing configured for the second frequency domain resource is $15*2^{M2}$ kHz, and the monitoring cycle of the communications device on the second frequency domain resource is L2 slots, where M1 and M2 are integers greater than or equal to 0, and L2 is an integer greater than or equal to 1. The duration of the second time period is $$\frac{N*L1*2^{M2-M1}}{L2}$$

monitoring cycles, or $$\left\lfloor \frac{N*L1*2^{M2-M1}}{L2} \right\rfloor$$

monitoring cycles, or $$\left\lceil \frac{N*L1*2^{M2-M1}}{L2} \right\rceil$$

monitoring cycles, or $N+L1*2^{M2-M1}$ slots, or $$L2*\left\lfloor\frac{N*L1*2^{M2-M1}}{L2}\right\rfloor$$

slots, or $$L2*\left\lceil\frac{N*L1*2^{M2-M1}}{L2}\right\rceil$$

slots on the second frequency domain resource.

In a possible implementation, the time unit is a monitoring occasion. The receiving unit is further configured to: before receiving the power saving signal sent by the network device, receive second configuration information sent by the network device, where the second configuration information includes a reference sub-carrier spacing and a reference monitoring cycle of the power saving signal.

The processing unit is specifically configured to determine duration of the first time period based on the reference sub-carrier spacing, the sub-carrier spacing configured for the first frequency domain resource, the reference monitoring cycle, the monitoring cycle of the communications device on the first frequency domain resource, and the N time units; and determine duration of the second time period based on the reference sub-carrier spacing, the sub-carrier spacing configured for the second frequency domain resource, the reference monitoring cycle, the monitoring cycle of the communications device on the second frequency domain resource, and the N time units.

In a possible implementation, the reference sub-carrier spacing is $15*2^{M0}$ kHz, and the reference monitoring cycle is L0 slots, where M0 is an integer greater than or equal to 0, and L0 is an integer greater than or equal to 1. The sub-carrier spacing configured for the first frequency domain resource is $15*2^{M1}$ kHz, the sub-carrier spacing configured for the second frequency domain resource is $15*2^{M2}$ kHz, the monitoring cycle of the communications device on the first frequency domain resource is L1 slots, and the monitoring cycle of the communications device on the second frequency domain resource is L2 slots, where M1 and M2 are integers greater than or equal to 0, and L1 and L2 are integers greater than or equal to 1.

The duration of the first time period is $$\frac{N*L0*2^{M1-M0}}{L1}$$

monitoring cycles, or $$\left\lfloor\frac{N*L0*2^{M1-M0}}{L1}\right\rfloor$$

monitoring cycles, or $$\left\lceil\frac{N*L0*2^{M1-M0}}{L1}\right\rceil$$

monitoring cycles, or $N*L0*2^{M1-M0}$ slots, or $$L1*\left\lfloor\frac{N*L0*2^{M1-M0}}{L1}\right\rfloor$$

slots, or $$L1*\left\lceil\frac{N*L0*2^{M1-M0}}{L1}\right\rceil$$

slots on the first frequency domain resource; and the duration of the second time period is $$\frac{N*L0*2^{M2-M0}}{L2}$$

monitoring cycles, or $$\left\lfloor\frac{N*L0*2^{M2-M0}}{L2}\right\rfloor$$

monitoring cycles, or $$\left\lceil\frac{N*L0*2^{M2-M0}}{L2}\right\rceil$$

monitoring cycles, or $N*L0*2^{M2-M0}$ slots $$L2*\left\lfloor\frac{N*L0*2^{M2-M0}}{L2}\right\rfloor$$

slots, or $$L2*\left\lceil\frac{N*L0*2^{M2-M0}}{L2}\right\rceil$$

slots on the second frequency domain resource.

In a possible implementation, the time unit is a C-DRX cycle, and a C-DRX cycle configured for the first frequency domain resource is K1 absolute time units, where K1 is an integer greater than or equal to 1. Duration of the first time period is N C-DRX cycles or N*K1 absolute time units on the first frequency domain resource; and duration of the second time period is determined based on a C-DRX cycle configured for the communications device on the first frequency domain resource, a C-DRX cycle configured for the communications device on the second frequency domain resource, and the N time units.

In a possible implementation, a C-DRX cycle configured for the second frequency domain resource is K2 absolute time units, where K2 is an integer greater than or equal to 1. The duration of the second time period is N*K1/K2 C-DRX cycles or N*K1 absolute time units on the second frequency domain resource.

In a possible implementation, the time unit is a C-DRX cycle; and the receiving unit is further configured to: before receiving the power saving signal sent by the network device, receive third configuration information sent by the network device, where the third configuration information indicates that a reference C-DRX cycle of the power saving signal is K0 absolute time units.

The processing unit is specifically configured to: determine the duration of the first time period based on the reference C-DRX cycle, the C-DRX cycle configured for the communications device on the first frequency domain resource, and the N time units; and determine the duration of the second time period based on the reference C-DRX cycle, the C-DRX cycle configured for the communications device on the second frequency domain resource, and the N time units.

In a possible implementation, the C-DRX cycle configured for the first frequency domain resource is K1 absolute time units, and the C-DRX cycle configured for the second frequency domain resource is K2 absolute time units, where K1 and K2 are integers greater than or equal to 1. The duration of the first time period is N*K0/K1 C-DRX cycles or N*K0 absolute time units on the first frequency domain resource; and the duration of the second time period is N*K0/K2 C-DRX cycles or N*K0 absolute time units on the second frequency domain resource.

In a possible implementation, the receiving unit receives, on the first frequency domain resource, the power saving signal sent by the network device.

In a possible implementation, the first frequency domain resource is a first carrier, and the second frequency domain resource is a second carrier; or the first frequency domain resource is a first bandwidth part BWP, and the second frequency domain resource is a second BWP.

In a possible implementation, the first signal is one or more of the following signals: a PDCCH, a CSI-RS, and an SSB.

According to a fourth aspect, an embodiment of this application further provides a communications device, including a sending unit and a processing unit.

The sending unit is configured to send a power saving signal to a terminal, where the power saving signal indicates N time units. N is an integer greater than 0, and the power saving signal is used to indicate a state of the terminal in a first time period corresponding to the N time units on a first frequency domain resource and a state in a second time period corresponding to the N time units on a second frequency domain resource. The state is a sleep state or a wake-up state, the sleep state indicates that the terminal monitors no first signal, and the wake-up state indicates that the terminal monitors a first signal based on a configuration parameter.

The processing unit is configured to send the first signal or skip sending the first signal to the terminal based on the state by using the sending unit.

In a possible implementation, the time unit is a slot. Duration of the first time period is N slots on the first frequency domain resource; and duration of the second time period is determined based on a sub-carrier spacing configured for the first frequency domain resource, a sub-carrier spacing configured for the second frequency domain resource, and the N time units.

In a possible implementation, the sub-carrier spacing configured for the first frequency domain resource is 15*2M1 kHz, and the sub-carrier spacing configured for the second frequency domain resource is 15*2M2 kHz, where M1 and M2 are integers greater than or equal to 0. The duration of the second time period is N*2M2−M1 slots, or $\lfloor N*2^{M2-M1} \rfloor$ slots, or $\lceil N*2^{M2-M1} \rceil$ slots on the second frequency domain resource.

In a possible implementation, the time unit is a slot. The sending unit is further configured to send first configuration information to the terminal before sending the power saving signal to the terminal, where the first configuration information includes a reference sub-carrier spacing of the power saving signal.

The duration of the first time period is determined based on the reference sub-carrier spacing, the sub-carrier spacing configured for the first frequency domain resource, and the N time units; and the duration of the second time period is determined based on the reference sub-carrier spacing, the sub-carrier spacing configured for the second frequency domain resource, and the N time units.

In a possible implementation, the reference sub-carrier spacing is 15*2M0 kHz, the sub-carrier spacing configured for the first frequency domain resource is 15*2M1 kHz, and the sub-carrier spacing configured for the second frequency domain resource is 15*2M2 kHz. The duration of the first time period is N*2M1−M0 slots, or $\lfloor N*2^{M1-M0} \rfloor$ slots, or $\lceil N+2^{M1-M0} \rceil$ slots on the first frequency domain resource; and the duration of the second time period is N*2M2−M0 slots, or $\lfloor N*2^{M2-M0} \rfloor$ slots, or $\lceil N+2^{M2-M0} \rceil$ slots on the second frequency domain resource.

In a possible implementation, the time unit is a monitoring occasion. Duration of the first time period is N monitoring cycles or N*L1 slots on the first frequency domain resource, where L indicates that a monitoring cycle of the terminal on the first frequency domain resource is L1 slots, and L1 is an integer greater than or equal to 1. Duration of the second time period is determined based on the sub-carrier spacing configured for the first frequency domain resource, the sub-carrier spacing configured for the second frequency domain resource, the monitoring cycle of the terminal on the first frequency domain resource, a monitoring cycle of the terminal on the second frequency domain resource, and the N time units.

In a possible implementation, the sub-carrier spacing configured for the first frequency domain resource is 15*2M1 kHz, the sub-carrier spacing configured for the second frequency domain resource is 15*2M2 kHz, and the monitoring cycle of the terminal on the second frequency domain resource is L2 slots, where M1 and M2 are integers greater than or equal to 0, and L2 is an integer greater than or equal to 1. The duration of the second time period is $$\frac{N*L1*2^{M2-M1}}{L2}$$

monitoring cycles, or $$\left\lfloor \frac{N*L1*2^{M2-M1}}{L2} \right\rfloor$$

monitoring cycles, or $$\left\lceil \frac{N*L1*2^{M2-M1}}{L2} \right\rceil$$

monitoring cycles, or $N*L1*2^{M2-M1}$ slots, or $$L2 * \left\lfloor \frac{N*L1*2^{M2-M1}}{L2} \right\rfloor$$

slots, or $$L2 * \left\lceil \frac{N*L1*2^{M2-M1}}{L2} \right\rceil$$

slots on the second frequency domain resource.

In a possible implementation, the time unit is a monitoring occasion. The sending unit is further configured to send second configuration information to the terminal before sending the power saving signal to the terminal, where the second configuration information includes a reference sub-carrier spacing and a reference monitoring cycle of the power saving signal.

The duration of the first time period is determined based on the reference sub-carrier spacing, the sub-carrier spacing configured for the first frequency domain resource, the reference monitoring cycle, the monitoring cycle of the terminal on the first frequency domain resource, and the N time units; and the duration of the second time period is determined based on the reference sub-carrier spacing, the sub-carrier spacing configured for the second frequency domain resource, the reference monitoring cycle, the monitoring cycle of the terminal on the second frequency domain resource, and the N time units.

In a possible implementation, the reference sub-carrier spacing is $15*2^{M0}$ kHz, and the reference monitoring cycle is L0 slots, where M0 is an integer greater than or equal to 0, and L0 is an integer greater than or equal to 1. The sub-carrier spacing configured for the first frequency domain resource is $15*2^{M1}$ kHz, the sub-carrier spacing configured for the second frequency domain resource is $15*2^{M2}$ kHz, the monitoring cycle of the terminal on the first frequency domain resource is L1 slots, and the monitoring cycle of the terminal on the second frequency domain resource is L2 slots, where M1 and M2 are integers greater than or equal to 0, and L1 and L2 are integers greater than or equal to 1.

The duration of the first time period is $$\frac{N*L0*2^{M1-M0}}{L1}$$

monitoring cycles, or $$\left\lfloor \frac{N*L0*2^{M1-M0}}{L1} \right\rfloor$$

monitoring cycles, or $$\left\lceil \frac{N*L0*2^{M1-M0}}{L1} \right\rceil$$

monitoring cycles, or $N*L0*2^{M1-M0}$ slots, or $$L1 * \left\lfloor \frac{N*L0*2^{M1-M0}}{L1} \right\rfloor$$

slots, or $$L1 * \left\lceil \frac{N*L0*2^{M1-M0}}{L1} \right\rceil$$

slots on the first frequency domain resource; and the duration of the second time period is $$\frac{N*L0*2^{M2-M0}}{L2}$$

monitoring cycles, or $$\left\lfloor \frac{N*L0*2^{M2-M0}}{L2} \right\rfloor$$

monitoring cycles, or $$\left\lceil \frac{N*L0*2^{M2-M0}}{L2} \right\rceil$$

monitoring cycles, or $N*L0*2^{M2-M0}$ slots, or $$L2 * \left\lfloor \frac{N*L0*2^{M2-M0}}{L2} \right\rfloor$$

slots, or $$L2 * \left\lceil \frac{N*L0*2^{M2-M0}}{L2} \right\rceil$$

slots on the second frequency domain resource.

In a possible implementation, the time unit is a C-DRX cycle, and a C-DRX cycle configured for the first frequency domain resource is K1 absolute time units, where K1 is an integer greater than or equal to 1. Duration of the first time period is N C-DRX cycles or N*K1 absolute time units on the first frequency domain resource; and duration of the second time period is determined based on a C-DRX cycle configured for the terminal on the first frequency domain resource, a C-DRX cycle configured for the terminal on the second frequency domain resource, and the N time units.

In a possible implementation, a C-DRX cycle configured for the second frequency domain resource is K2 absolute time units, where K2 is an integer greater than or equal to 1. The duration of the second time period is N*K1/K2 C-DRX cycles or N*K1 absolute time units on the second frequency domain resource.

In a possible implementation, the sending unit is further configured to send third configuration information to the terminal, where the third configuration information indicates that a reference C-DRX cycle of the power saving signal is K0 absolute time units.

The duration of the first time period is determined based on the reference C-DRX cycle, the C-DRX cycle configured for the terminal on the first frequency domain resource, and the N time units; and the duration of the second time period is determined based on the reference C-DRX cycle, the C-DRX cycle configured for the terminal on the second frequency domain resource, and the N time units.

In a possible implementation, the C-DRX cycle configured for the first frequency domain resource is K1 absolute time units, and the C-DRX cycle configured for the second frequency domain resource is K2 absolute time units, where K1 and K2 are integers greater than or equal to 1. The duration of the first time period is N*K0/K1 C-DRX cycles or N*K0 absolute time units on the first frequency domain resource; and the duration of the second time period is N*K0/K2 C-DRX cycles or N*K0 absolute time units on the second frequency domain resource.

In a possible implementation, the sending unit sends the power saving signal to the terminal on the first frequency domain resource.

In a possible implementation, the first frequency domain resource is a first carrier, and the second frequency domain resource is a second carrier; or the first frequency domain resource is a first bandwidth part BWP, and the second frequency domain resource is a second BWP In a possible implementation, the first signal is one or more of the following signals: a PDCCH, a CSI-RS, and an SSB.

According to a fifth aspect, an embodiment of this application provides a communications device, including a processor and a communications interface, where the processor is coupled to a memory and the communications interface.

The processor is configured to call a program stored in the memory to perform the following steps:

receiving, by using the communications interface, a power saving signal sent by a network device, where the power saving signal indicates N time units, and N is an integer greater than 0; and determining, based on the power saving signal, a state of the communications device in a first time period corresponding to the N time units on a first frequency domain resource and a state in a second time period corresponding to the N time units on a second frequency domain resource.

The state is a sleep state or a wake-up state, the sleep state indicates that the communications device monitors no first signal, and the wake-up state indicates that the communications device monitors a first signal based on a configuration parameter.

In a possible implementation, the tune unit is a slot. Duration of the first time period is N slots on the first frequency domain resource; and duration of the second time period is determined based on a sub-carrier spacing configured for the first frequency domain resource, a sub-carrier spacing configured for the second frequency domain resource, and the N time units.

In a possible implementation, the sub-carrier spacing configured for the first frequency domain resource is 15*2M1 kHz, and the sub-carrier spacing configured for the second frequency domain resource is 15*2M2 kHz, where M1 and M2 are integers greater than or equal to 0. The duration of the second time period is N*2M2−M1 slots, or $\lfloor N*2^{M2-M1} \rfloor$ slots, or $\lceil N*2^{M2-M1} \rceil$ slots on the second frequency domain resource.

In a possible implementation, the time unit is a slot. Before receiving, by using the communications interface, the power saving signal sent by the network device, the processor is further configured to receive, by using the communications interface, first configuration information sent by the network device, where the first configuration information includes a reference sub-carrier spacing of the power saving signal.

The processor is specifically configured to: determine the duration of the first time period based on the reference sub-carrier spacing, the sub-carrier spacing configured for the first frequency domain resource, and the N time units; and determine the duration of the second time period based on the reference sub-carrier spacing, the sub-carrier spacing configured for the second frequency domain resource, and the N time units.

In a possible implementation, the reference sub-carrier spacing is 15*2M0 kHz, the sub-carrier spacing configured for the first frequency domain resource is 15*2M1 kHz, and the sub-carrier spacing configured for the second frequency domain resource is 15*2M2 kHz. The duration of the first time period is N*2M1−M0 slots, or $\lfloor N*2^{M1-M0} \rfloor$ slots, or $\lceil N*2^{M1-M0} \rceil$ slots on the first frequency domain resource; and the duration of the second time period is N*2M2−M0 slots, or $\lfloor N*2^{M2-M0} \rfloor$ slots, or $\lceil N*2^{M2-M0} \rceil$ slots on the second frequency domain resource.

In a possible implementation, the time unit is a monitoring occasion. Duration of the first time period is N monitoring cycles or N*L1 slots on the first frequency domain resource, where L indicates that a monitoring cycle of the communications device on the first frequency domain resource is L1 slots, and L1 is an integer greater than or equal to 1. Duration of the second time period is determined based on the sub-carrier spacing configured for the first frequency domain resource, the sub-carrier spacing configured for the second frequency domain resource, the monitoring cycle of the communications device on the first frequency domain resource, a monitoring cycle of the communications device on the second frequency domain resource, and the N time units.

In a possible implementation, the sub-carrier spacing configured for the first frequency domain resource is 15*2M1 kHz, the sub-carrier spacing configured for the second frequency domain resource is 15*2M2 kHz, and the monitoring cycle of the communications device on the second frequency domain resource is L2 slots, where M1 and M2 are integers greater than or equal to 0, and L2 is an integer greater than or equal to 1. The duration of the second time period is $$\frac{N*L1*2^{M2-M1}}{L2}$$

monitoring cycles, or $$\left\lfloor \frac{N*L1*2^{M2-M1}}{L2} \right\rfloor$$

monitoring cycles, or $$\left\lceil \frac{N*L1*2^{M2-M1}}{L2} \right\rceil$$

monitoring cycles, or $N*L1*2^{M2-M1}$ slots, or $$L2 * \left\lfloor \frac{N*L1*2^{M2-M1}}{L2} \right\rfloor$$

slots, or $$L2 * \left\lceil \frac{N*L1*2^{M2-M1}}{L2} \right\rceil$$

slots on the second frequency domain resource.

In a possible implementation, the time unit is a monitoring occasion. Before receiving, by using the communications interface, the power saving signal sent by the network device, the processor is further configured to receive, by using the communications interface, second configuration information sent by the network device, where the second configuration information includes a reference sub-carrier spacing and a reference monitoring cycle of the power saving signal.

The processor is specifically configured to: determine duration of the first time period based on the reference sub-carrier spacing, the sub-carrier spacing configured for the first frequency domain resource, the reference monitoring cycle, the monitoring cycle of the communications device on the first frequency domain resource, and the N time units; and determine duration of the second time period based on the reference sub-carrier spacing, the sub-carrier spacing configured for the second frequency domain resource, the reference monitoring cycle, the monitoring cycle of the communications device on the second frequency domain resource, and the N time units.

In a possible implementation, the reference sub-carrier spacing is 15*2M0 kHz, and the reference monitoring cycle is L0 slots, where M0 is an integer greater than or equal to 0, and L0 is an integer greater than or equal to 1. The sub-carrier spacing configured for the first frequency domain resource is 15*2M1 kHz, the sub-carrier spacing configured for the second frequency domain resource is 15*2M2 kHz, the monitoring cycle of the communications device on the first frequency domain resource is L1 slots, and the monitoring cycle of the communications device on the second frequency domain resource is L2 slots, where M1 and M2 are integers greater than or equal to 0, and L1 and L2 are integers greater than or equal to 1.

The duration of the first time period is $$\frac{N*L0*2^{M1-M0}}{L1}$$

monitoring cycles, or $$\left\lfloor \frac{N*L0*2^{M1-M0}}{L1} \right\rfloor$$

monitoring cycles, or $$\left\lceil \frac{N*L0*2^{M1-M0}}{L1} \right\rceil$$

monitoring cycles, or $N*L0*2M1-M$ slots, or $$L1 * \left\lfloor \frac{N*L0*2^{M1-M0}}{L1} \right\rfloor$$

slots, or $$L1 * \left\lceil \frac{N*L0*2^{M1-M0}}{L1} \right\rceil$$

slots on the first frequency domain resource; and the duration of the second time period is $$\frac{N*L0*2^{M2-M0}}{L2}$$

monitoring cycles, or $$\left\lfloor \frac{N*L0*2^{M2-M0}}{L2} \right\rfloor$$

monitoring cycles, or $$\left\lceil \frac{N*L0*2^{M2-M0}}{L2} \right\rceil$$

monitoring cycles, or $N*L0*2^{M2-M0}$ slots, or $$L2 * \left\lfloor \frac{N*L0*2^{M2-M0}}{L2} \right\rfloor$$

slots, or $$L2 * \left\lceil \frac{N*L0*2^{M2-M0}}{L2} \right\rceil$$

slots on the second frequency domain resource.

In a possible implementation, the time unit is a C-DRX cycle, and a C-DRX cycle configured for the first frequency domain resource is K1 absolute time units, where K1 is an integer greater than or equal to 1. Duration of the first time period is N C-DRX cycles or N*K1 absolute time units on the first frequency domain resource; and duration of the second time period is determined based on a C-DRX cycle configured for the communications device on the first frequency domain resource, a C-DRX cycle configured for the communications device on the second frequency domain resource, and the N time units.

In a possible implementation, a C-DRX cycle configured for the second frequency domain resource is K2 absolute time units, where K2 is an integer greater than or equal to 1. The duration of the second time period is N*K1/K2 C-DRX cycles or N*K1 absolute time units on the second frequency domain resource.

In a possible implementation, the time unit is a C-DRX cycle. Before receiving, by using the communications interface, the power saving signal sent by the network device, the processor is further configured to receive, by using the communications interface, third configuration information sent by the network device, where the third configuration information indicates that a reference C-DRX cycle of the power saving signal is K0 absolute time units.

The processor is specifically configured to: determine the duration of the first time period based on the reference C-DRX cycle, the C-DRX cycle configured for the communications device on the first frequency domain resource, and the N time units, and determine the duration of the second time period based on the reference C-DRX cycle, the C-DRX cycle configured for the communications device on the second frequency domain resource, and the N time units.

In a possible implementation, the C-DRX cycle configured for the first frequency domain resource is K1 absolute time units, and the C-DRX cycle configured for the second frequency domain resource is K2 absolute time units, where K1 and K2 are integers greater than or equal to 1. The duration of the first time period is N*K0/K1 C-DRX cycles or N*K0 absolute time units on the first frequency domain resource; and the duration of the second time period is N*K0/K2 C-DRX cycles or N*K0 absolute time units on the second frequency domain resource.

In a possible implementation, the communications device receives, on the first frequency domain resource by using the communications interface, the power saving signal sent by the network device.

In a possible implementation, the first frequency domain resource is a first carrier, and the second frequency domain resource is a second carrier; or the first frequency domain resource is a first bandwidth part BWP, and the second frequency domain resource is a second BWP.

In a possible implementation, the first signal is one or more of the following signals: a PDCCH, a CSI-RS, and an SSB.

The communications device may be a chip, and the memory may be an on-chip memory or an off-chip memory.

According to a sixth aspect, an embodiment of this application provides a communications device, including a processor, and a communications interface, where the processor is coupled to a memory and the communications interface.

The processor is configured to call a program stored in the memory to perform the following steps:

sending a power saving signal to a terminal by using the communications interface, where the power saving signal indicates N time units, N is an integer greater than 0, the power saving signal is used to indicate a state of the terminal in a first time period corresponding to the N time units on a first frequency domain resource and a state in a second time period corresponding to the N time units on a second frequency domain resource, the state is a sleep state or a wake-up state, the sleep state indicates that the terminal monitors no first signal, and the wake-up state indicates that the terminal monitors a first signal based on a configuration parameter; and sending a first signal to the terminal or skipping sending a first signal based on the state by using the communications interface.

In a possible implementation, the time unit is a slot. Duration of the first time period is N slots on the first frequency domain resource; and duration of the second time period is determined based on a sub-carrier spacing configured for the first frequency domain resource, a sub-carrier spacing configured for the second frequency domain resource, and the N time units.

In a possible implementation, the sub-carrier spacing configured for the first frequency domain resource is 15*2M1 kHz, and the sub-carrier spacing configured for the second frequency domain resource is 15*2M2 kHz, where M1 and M2 are integers greater than or equal to 0. The duration of the second time period is N*2M2−M1 slots, or $\lfloor N*2^{M2-M1} \rfloor$ slots, or $\lceil N*2^{M2-M1} \rceil$ slots on the second frequency domain resource.

In a possible implementation, the time unit is a slot. Before sending the power saving signal to the terminal by using the communications interface, the processor is further configured to send first configuration information to the terminal by using the communications interface, where the first configuration information includes a reference sub-carrier spacing of the power saving signal.

The duration of the first time period is determined based on the reference sub-carrier spacing, the sub-carrier spacing configured for the first frequency domain resource, and the N time units; and the duration of the second time period is determined based on the reference subcarrier spacing, the sub-carrier spacing configured for the second frequency domain resource, and the N time units.

In a possible implementation, the reference sub-carrier spacing is 15*2M0 kHz, the sub-carrier spacing configured for the first frequency domain resource is 15*2M1 kHz, and the sub-carrier spacing configured for the second frequency domain resource is 15*2M2 kHz. The duration of the first time period is N*2M1−M0 slots, or $\lfloor N*2^{M1-M0} \rfloor$ slots, or $\lceil N*2^{M1-M0} \rceil$ slots on the first frequency domain resource; and the duration of the second time period is N*2M2−M0 slots, or $\lfloor N*2^{M2-M0} \rfloor$ slots, or $\lceil N+2^{M2-M0} \rceil$ slots on the second frequency domain resource.

In a possible implementation, the time unit is a monitoring occasion. Duration of the first time period is N monitoring cycles or N*L1 slots on the first frequency domain resource, where L indicates that a monitoring cycle of the terminal on the first frequency domain resource is L1 slots, and L1 is an integer greater than or equal to 1. Duration of the second time period is determined based on the sub-carrier spacing configured for the first frequency domain resource, the sub-carrier spacing configured for the second frequency domain resource, the monitoring cycle of the terminal on the first frequency domain resource, a monitoring cycle of the terminal on the second frequency domain resource, and the N time units.

In a possible implementation, the sub-carrier spacing configured for the first frequency domain resource is 15*2M1 kHz, the sub-carrier spacing configured for the second frequency domain resource is 15*2M2 kHz, and the monitoring cycle of the terminal on the second frequency domain resource is L2 slots, where M1 and M2 are integers greater than or equal to 0, and L2 is an integer greater than or equal to 1. The duration of the second time period is $$\frac{N*L1*2^{M2-M1}}{L2}$$

monitoring cycles, or $$\left\lfloor \frac{N*L1*2^{M2-M1}}{L2} \right\rfloor$$

monitoring cycles, or $$\left\lceil \frac{N*L1*2^{M2-M1}}{L2} \right\rceil$$

monitoring cycles, or $N*L1*2^{M2-M1}$ slots, or $$L2*\left\lfloor \frac{N*L1*2^{M2-M1}}{L2} \right\rfloor$$

slots, or $$L2*\left\lceil \frac{N*L1*2^{M2-M1}}{L2} \right\rceil$$

slots on the second frequency domain resource.

In a possible implementation, the time unit is a monitoring occasion. Before sending the power saving signal to the terminal by using the communications interface, the processor is further configured to send second configuration information to the terminal by using the communications interface, where the second configuration information includes a reference sub-carrier spacing and a reference monitoring cycle of the power saving signal.

The duration of the first time period is determined based on the reference sub-carrier spacing, the sub-carrier spacing configured for the first frequency domain resource, the reference monitoring cycle, the monitoring cycle of the terminal on the first frequency domain resource, and the N time units; and the duration of the second time period is determined based on the reference sub-carrier spacing, the sub-carrier spacing configured for the second frequency domain resource, the reference monitoring cycle, the monitoring cycle of the terminal on the second frequency domain resource, and the N time units.

In a possible implementation, the reference sub-carrier spacing is $15*2^{M0}$ kHz, and the reference monitoring cycle is L0 slots, where M0 is an integer greater than or equal to 0, and L0 is an integer greater than or equal to 1. The sub-carrier spacing configured for the first frequency domain resource is $15*2^{M1}$ kHz, the sub-carrier spacing configured for the second frequency domain resource is $15*2^{M2}$ kHz, the monitoring cycle of the terminal on the first frequency domain resource is L1 slots, and the monitoring cycle of the terminal on the second frequency domain resource is L2 slots, where M1 and M2 are integers greater than or equal to 0, and L1 and L2 are integers greater than or equal to 1.

The duration of the first time period is $$\frac{N*L0*2^{M1-M0}}{L1}$$

monitoring cycles, or $$\left\lfloor \frac{N*L0*2^{M1-M0}}{L1} \right\rfloor$$

monitoring cycles, or $$\left\lceil \frac{N*L0*2^{M1-M0}}{L1} \right\rceil$$

monitoring cycles, or $N*L0*2^{M1-M0}$ slots, or $$L1*\left\lfloor \frac{N*L0*2^{M1-M0}}{L1} \right\rfloor$$

slots, or $$L1*\left\lceil \frac{N*L0*2^{M1-M0}}{L1} \right\rceil$$

slots on the first frequency domain resource; and the duration of the second time period is $$\frac{N*L0*2^{M2-M0}}{L2}$$

monitoring cycles, or $$\left\lfloor \frac{N*L0*2^{M2-M0}}{L2} \right\rfloor$$

monitoring cycles, or $$\left\lceil \frac{N*L0*2^{M2-M0}}{L2} \right\rceil$$

monitoring cycles, or $N*L0*2^{M2-M0}$ slots, or $$L2*\left\lfloor \frac{N*L0*2^{M2-M0}}{L2} \right\rfloor$$

slots, or $$L2*\left\lceil \frac{N*L0*2^{M2-M0}}{L2} \right\rceil$$

slots on the second frequency domain resource.

In a possible implementation, the time unit is a C-DRX cycle, and a C-DRX cycle configured for the first frequency domain resource is K1 absolute time units, where K1 is an integer greater than or equal to 1. Duration of the first time period is N C-DRX cycles or N*K1 absolute time units on the first frequency domain resource; and duration of the second time period is determined based on a C-DRX cycle configured for the terminal on the first frequency domain resource, a C-DRX cycle configured for the terminal on the second frequency domain resource, and the N time units.

In a possible implementation, the C-DRX cycle configured for the second frequency domain resource is K2 absolute time units, where K2 is an integer greater than or equal to 1. The duration of the second time period is N*K1/K2 C-DRX cycles or N*K1 absolute time units on the second frequency domain resource.

In a possible implementation, the processor is further configured to send third configuration information to the terminal by using the communications interface, where the third configuration information indicates that a reference C-DRX cycle of the power saving signal is K0 absolute time units.

The duration of the first time period is determined based on the reference C-DRX cycle, the C-DRX cycle configured for the terminal on the first frequency domain resource, and the N time units; and the duration of the second time period is determined based on the reference C-DRX cycle, the C-DRX cycle configured for the terminal on the second frequency domain resource, and the N time units.

In a possible implementation, the C-DRX cycle configured for the first frequency domain resource is K1 absolute time units, and the C-DRX cycle configured for the second frequency domain resource is K2 absolute time units, where K1 and K2 are integers greater than or equal to 1. The duration of the first time period is N*K0/K1 C-DRX cycles or N*K0 absolute time units on the first frequency domain resource; and the duration of the second tune period is N*K0/K2 C-DRX cycles or N*K0 absolute time units on the second frequency domain resource.

In a possible implementation, the communications device sends the power saving signal to the terminal on the first frequency domain resource by using the communications interface.

In a possible implementation, the first frequency domain resource is a first carrier, and the second frequency domain resource is a second carrier; or the first frequency domain resource is a first bandwidth part BWP, and the second frequency domain resource is a second BWP.

In a possible implementation, the first signal is one or more of the following signals: a PDCCH, a CSI-RS, and an SSB.

The communications device may be a chip, and the memory may be an on-chip memory or an off-chip memory.

According to a seventh aspect, an embodiment of this application provides a computer-readable storage medium, where the computer-readable storage medium stores a computer instruction, and when the instruction is run on a computer, the computer is caused to perform functions performed by the terminal in the method according to any one of the first aspect or the second aspect, or the computer is caused to perform functions performed by the network device in the method according to any one of the first aspect or the second aspect.

According to an eighth aspect, an embodiment of this application provides a computer program product including an instruction. When the computer program product is run on a computer, the computer is caused to perform functions performed by the terminal in the method according to any one of the first aspect or the second aspect, or the computer is caused to perform functions performed by the network device in the method according to any one of the first aspect or the second aspect.

According to a ninth aspect, this application provides a chip. The chip is connected to a memory, and is configured to read and execute a software program stored in the memory, to implement functions performed by the terminal in the method according to any one of the first aspect or the second aspect, or implement functions performed by the network device in the method according to any one of the first aspect or the second aspect.

DESCRIPTION OF EMBODIMENTS

Figure 1:
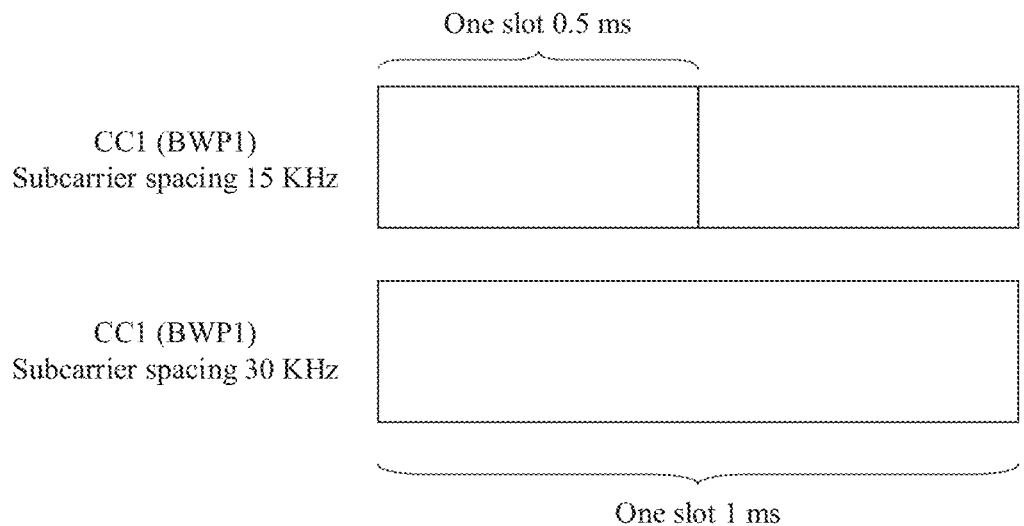
FIG. 1 is a schematic diagram of slots on different frequency domain resources according to an embodiment of tis application.

To make the objectives, technical solutions, and advantages of this application clearer, the following further describes this application in detail with reference to the accompanying drawings.

First, concepts involved in this application are described.

Carrier Aggregation (Carrier Aggregation, CA)

In an initial phase of standard formulation of long term evolution (long term evolution. LTE), it is specified that a maximum bandwidth of one carrier is 20 MHz. In the subsequent standardization process, the LTE is further improved, which is referred to LTE-A. To meet the requirement of a downlink peak rate of 1 Gbps and an uplink peak rate of 500 Mbps of the LTE-A, a maximum transmission bandwidth of 100 MHz is required. Due to the scarcity of large-bandwidth continuous spectrums, the LTE-A proposes a solution of carrier aggregation. The carrier aggregation is to aggregate two or more component carriers (component carriers. CCs) to support a larger transmission bandwidth. Generally, one CC may be equivalent to one cell, and a maximum bandwidth of each CC is 20 MHz.

One terminal may be configured with a plurality of CCs. One CC is referred to as a primary cell (primary cell, PCell), and is a cell that the terminal initially accesses, or a cell on which radio resource control (radio resource control, RRC) connection reestablishment is performed, or a primary cell specified in a handover (handover) process. The PCell is responsible for performing RRC communication with the terminal, and a physical uplink control channel (physical uplink control channel. PUCCH) is sent only on the PCell. The remaining CCs are referred to as secondary cells (secondary cells. SCells) and are added during RRC reconfiguration, to provide additional radio resources.

In new radio (new radio, NR), a CA technology is still used, and a maximum of 16 CCs are supported in an uplink and in a downlink separately. In addition, when a bandwidth of a base station is relatively large and a capability of the terminal is insufficient to support the large bandwidth by using a single carrier, the terminal may support the large bandwidth in an intra band contiguous CA (intra band contiguous CA) manner. For example, when the bandwidth of the base station is 400 MHz, and a maximum continuous bandwidth supported by the terminal is 100 MHz, the terminal may consider the bandwidth of the base station as aggregation of four 100 MHz bandwidths, and communicate with the base station in a CA manner.

Bandwidth Part (BWP)

The concept of a BWP is introduced to NR, to be specific, a part of bandwidth is supported for transmission between a network device and UE. A 5G system bandwidth (refers to a bandwidth of one carrier, and corresponds to a bandwidth of each CC in a CA or dual connectivity (dual connectivity. DC) scenario) may be 200 MHz or 400 MHz. Some terminals do not support such a large bandwidth. Therefore, the network device may configure a BWP (a part of the system bandwidth), for example, 20 MHz, for the terminal, and the terminal may communicate with the network device on the 20 MHz bandwidth.

The BWP may be classified into a downlink BWP (downlink BWP. DL BWP) and an uplink BWP (uplink BWP. UL BWP). The network device may configure a plurality of DL BWPs and/or a plurality of UL BWPs for the terminal, and activate at least one DL BWP and at least one UL BWP. The UE receives, on the activated DL BWP, a downlink signal sent by the network device, including but not limited to: downlink control signaling, downlink data, and the like. The terminal sends an uplink signal on the activated UL BWP, including but not limited to: uplink control signaling, uplink data, an uplink scheduling request (scheduling request. SR), an uplink sounding reference signal (sounding reference signal, SRS), channel state information (channel state information. CSI), a channel quality indicator (channel quality indicator, CQI) feedback, and the like.

Numerology (Numerology)

The concept of a numerology is introduced to standardization of NR. The NR supports a plurality of numerologies, and each numerology is determined by a sub-carrier spacing (sub-carrier spacing, SCS) and a cyclic prefix (cyclic shift, CP). Different numerologies may be time-division multiplexed or frequency-division multiplexed. In other words, different numerologies may be used in different time domains or frequency domains.

Different CCs or BWPs may have different numerologies. Different numerologies result in different slot lengths. As shown in FIG. 1, for example, when a sub-carrier spacing of CC1 is 30 kHz and a sub-carrier spacing of CC2 is 15 kHz, a length of one slot on CC2 is equal to a length of two slots on CC1.

Power Saving Signal (Power Saving Signal)

To reduce power consumption of the terminal, the network device may indicate, by using a power saving signal (power saving signal), the terminal whether to monitor a physical downlink control channel (physical downlink control channel. PDCCH). The terminal monitors, based on the power saving signal, the PDCCH in a time period in which the network device may schedule the terminal, namely, the terminal is in a wake-up state, but does not monitor the PDCCH in a time period in which the network device does not schedule the terminal, namely, the terminal is in a sleep state. The power saving signal can be implemented in the following three manners:

1. A wake-up signal, used to indicate, when the terminal is in the sleep state (namely, the terminal does not monitor the PDCCH, and/or does not receive a downlink reference signal, and/or performs no measurement), the terminal when to enter the wake-up state, to monitor the PDCCH, and/or receive a downlink reference signal, and/or perform measurement based on a configuration parameter.

2. A sleep signal, used to indicate, when the terminal is in the wake-up state (namely, the terminal monitors the PDCCH and/or receives the downlink reference signal, and/or performs measurement based on the configuration parameter), the terminal when to enter the sleep state, to not monitor the PDCCH, and/or not receive the downlink reference signal, and/or not perform measurement.

3. A general power saving signal, where the signal includes indication information, to further indicate whether the terminal needs to be in the wake-up state or the sleep state in a next period of time: and after receiving the signal, the terminal determines, based on the indication information, whether the terminal is in the wake-up state or the sleep state in subsequent time.

When the terminal is in the sleep state, related circuits may be disabled to reduce power consumption of the terminal.

If the network device determines to not send the PDCCH to the terminal in a period of time, the network device may indicate the terminal to enter the sleep state, to reduce power consumption of the terminal. For example, if terminal A does not perform uplink or downlink data transmission with the network device in a period of time, the network device may deduce that terminal A may have no data transmission requirement in a future period of time, and therefore send a power saving signal to terminal A, to indicate terminal A to enter the sleep state in a future period of time, to reduce power consumption. For another example, if the network device is currently very busy, has a relatively large amount of to-be-received or to-be-sent data, and has no time to schedule terminal B in a future period of time, the network device sends a power saving signal to terminal B, to indicate terminal B to no longer monitor the PDCCH does not need to be monitored m a future period of time, to reduce power consumption of terminal B.

The power saving signal may be sent to the terminal by using DCI, which has high reliability and a relatively low probability of missing/false detection. However, an existing DCI format (DCI format) needs to be modified, or a new DCI format needs to be introduced.

The power saving signal may alternatively be sent to the terminal by using a sequence (sequence) or a reference signal (reference signal, RS) without designing a DCI format or increasing complexity of blind detection of DCI by the terminal. However, the reliability is relatively low, a probability of missing or false detection is high, and air interface resources may be wasted.

In a CA scenario, the power saving signal may be separately sent on each CC to indicate a state of the terminal on each CC. However, to reduce signaling overheads, it is more likely that the power saving signal is sent on one CC. In this case, the power saving signal sent on one CC may indicate states of the terminal on a plurality of CCs.

Similarly, in a BWP scenario, the power saving signal may also be separately sent on each BWP. However, to reduce signaling overheads, it is more likely that the power saving signal is sent on only one BWP, to indicate states of the terminal on a plurality of BWPs.

If the terminal determines, based on the power saving signal, that at a moment, the terminal is in the sleep state on CC1 (or BWP1) and in the wake-up state on CC2 (or BWP2), related circuits of the terminal cannot be completely disabled, and a power saving effect is not significant. Ideally, when there is no service requirement, the terminal is not scheduled on all CCs (or BWPs). When there is a service requirement, the terminal is simultaneously scheduled on each CC (or BWP), thereby improving data transmission efficiency and reducing a transmission delay.

However, when the network device indicates, on one CC (or one BWP), states of the terminal on a plurality of CCs (or a plurality of BWPs), for how the terminal determines the states on the plurality of CCs (or the plurality of BWPs) based on the power saving signal sent on one CC (or one BWP), there is no clear solution in the standard currently.

Figure 2:
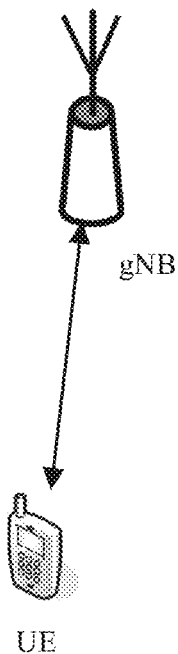
FIG. 2 is an application scenario according to an embodiment of this application.

To resolve the foregoing problem, the embodiments of this application provide a communications method and apparatus, so that a terminal can determine states on different frequency domain resources based on a power saving signal received on one frequency domain resource. FIG. 2 provides an example of an application scenario of a communications method according to an embodiment of this application.

In this embodiment of this application, signaling of t power saving signal is not limited. A network device may send the signaling to the terminal by using DCI, or may send the signaling to the terminal by using a sequence or a reference signal, or certainly, may send the signaling to the terminal by using other signaling.

With reference to FIG. 2, the network device in this embodiment of this application may be a base station, or another router configured to mutually convert a received over-the-air frame and an internet protocol (Internet Protocol, IP) packet and serve as a router between the wireless terminal and a rest portion of the access network, where the rest portion of the access network may include an IP network. The network device may also be configured to coordinate attribute management of the air interface. In communications systems that use different radio access technologies, names of devices having base station functions may be different. For example, a base station in an LTE system is referred to as an evolved nodeB (evolutional nodeB, eNB), a gNB (gNB) in an NR system, or the like. This is not limited in this embodiment of this application.

With reference to FIG. 2, the terminal in the embodiments of this application may also be referred to as user equipment (user equipment, UE), an access terminal device, a subscriber unit, a subscriber station, a mobile station, a mobile console, a remote station, a remote terminal device, a mobile device, a user terminal device, a terminal device, a wireless communication device, a user agent, or a user apparatus. The terminal may be a cellular phone, a cordless phone, a session initiation protocol (session initiation protocol, SIP) phone, a wireless local loop (wireless local loop, WLL) station, a personal digital assistant (personal digital assistant. PDA), a handheld device having a wireless communication function, a computing device, another processing device connected to a wireless modem, a vehicle-mounted device, a wearable device, a terminal device in a future 5G network, or a terminal device in a future evolved public land mobile network (public land mobile network, PLMN). This is not limited in the embodiments of this application.

Figure 3:
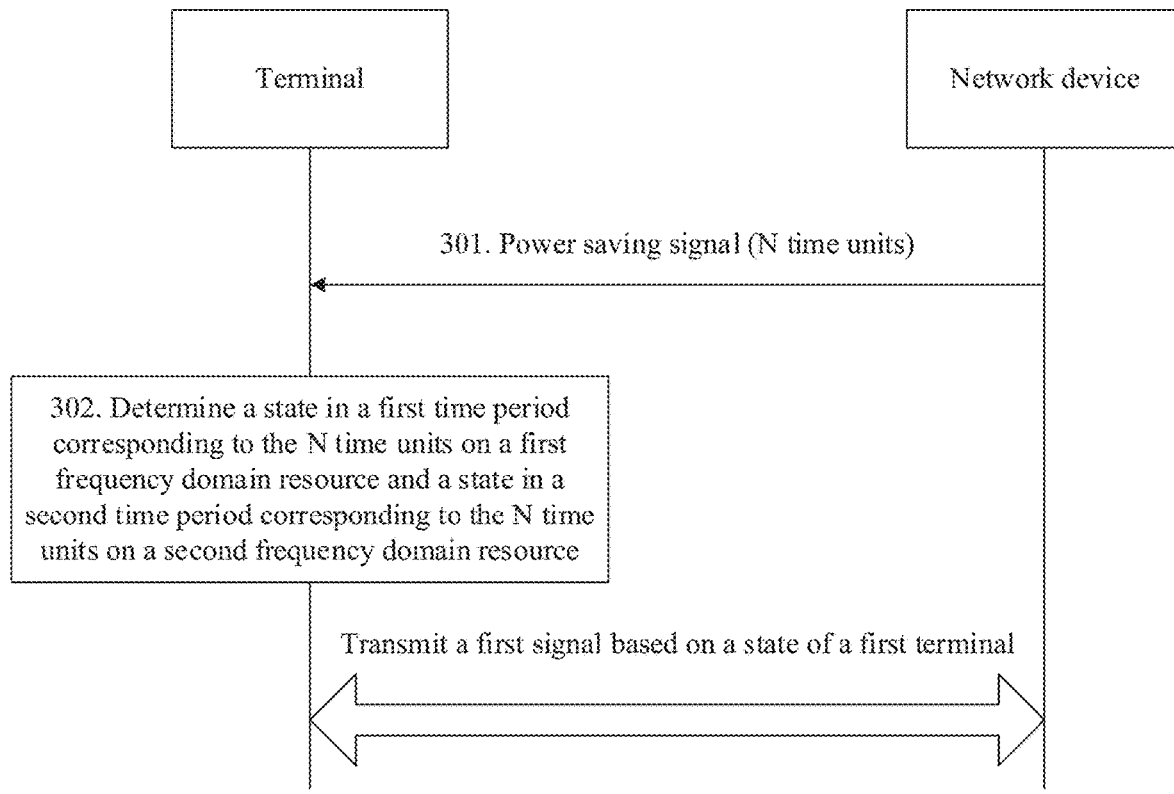
FIG. 3 is a schematic flowchart of a communications method according to an embodiment of this application.

A schematic flowchart of the communications method provided in this embodiment of this application may be shown in FIG. 3. The method may include the following steps:

Step 301: A network device sends a power saving signal to a terminal, where the power saving signal indicates N time units, and N is greater than 0. Optionally, N is an integer greater than 0.

Step 302: After receiving the power saving signal, the terminal determines a state in a first time period corresponding to the N time units on a first frequency domain resource and a state in a second time period corresponding to the N time units on a second frequency domain resource.

The state includes a sleep state or a wake-up state, the sleep state indicates that the terminal monitors no first signal, and the wake-up state indicates that the terminal monitors a first signal based on a configuration parameter.

The network device may send a sleep signal to the terminal in the wake-up state, and the terminal determines, based on the sleep signal, to enter the sleep state in the first time period on the first frequency domain resource and in the second time period on the second frequency domain resource. Alternatively, the network device may send a wake-up signal to the terminal in the sleep state, and the terminal determines, based on the wake-up signal, to enter the wake-up state in the first time period on the first frequency domain resource and in the second time period on the second frequency domain resource. Alternatively, the power saving signal sent by the network device to the terminal carries state indication information, and the terminal enters a state based on the indication information. For example, if the indication information indicates the terminal to enter the wake-up state, the terminal enters the wake-up state in the first time period on the first frequency domain resource and in the second time period on the second frequency domain resource: and if the indication information indicates the terminal to enter the sleep state, the terminal enters the sleep state in the first time period on the first frequency domain resource and in the second time period on the second frequency domain resource.

In this embodiment of this application, in addition to indicating whether the terminal monitors a PDCCH, the power saving signal may also be used to indicate whether the terminal monitors another signal. For example, the first signal may also be a CSI-RS, an SSB, or the like. In the following embodiment, an example in which the first signal is a PDCCH is used for detailed description. It should be understood that, the PDCCH in the following embodiment may also be replaced with another signal such as a CSI-RS and an SSB.

The frequency domain resources may be CCs. To be specific, the first frequency domain resource is a first CC, and the second frequency domain resource is a second CC. Further, the first CC may be a primary CC, and the first CC may be a secondary CC.

Alternatively, the frequency domain resource may be a BWP. To be specific, the first frequency domain resource is a first BWP, and the second frequency domain resource is a second BWP. Further, the first BWP may be a primary BWP, and the second BWP may be a secondary BWP. Alternatively, the first BWP may be a BWP on a primary CC, and the second BWP may be a BWP on a secondary CC. The BWP may also be sometimes referred to as a carrier bandwidth part (carrier bandwidth part), a subband (subband) bandwidth, a narrowband (narrowband) bandwidth, or another name. This is not limited in this application.

In a possible implementation, the N time units indicated by the power saving signal may be N slots, N monitoring occasions, or N C-DRX cycles. The following separately describes how to determine a first time period and a second time period in the three cases.

In an embodiment, the N time units are N slots.

As described above, the slot is not an absolute time unit, and an absolute time length of one slot is related to a size of a sub-carrier spacing. Therefore, when determining a value of N, the network device needs to consider the size of the sub-carrier spacing.

In a possible implementation, a sub-carrier spacing configured for the first frequency domain resource is used as a reference sub-carrier spacing, and therefore. N slots indicated by the network device are N slots on the first frequency domain resource. Therefore, the terminal may directly determine that the first time period is the N slots on the first frequency domain resource.

The terminal may determine duration of the second time period based on the sub-carrier spacing configured for the first frequency domain resource, a sub-carrier spacing configured for the second frequency domain resource, and N.

Optionally, the terminal may calculate the duration of the second time period based on the sub-carrier spacing of the first frequency domain resource, the sub-carrier spacing of the second frequency domain resource, and N. For example, if the sub-carrier spacing configured for the first frequency domain resource is $15*2^{M1}$ kHz, and the sub-carrier spacing configured for the second frequency domain resource is $15*2^{M2}$ kHz, where M1 and M2 are integers greater than or equal to 0, the terminal determines that the duration of the second time period is $N*2^{M2-M1}$ slots on the second frequency domain resource.

Figure 4:
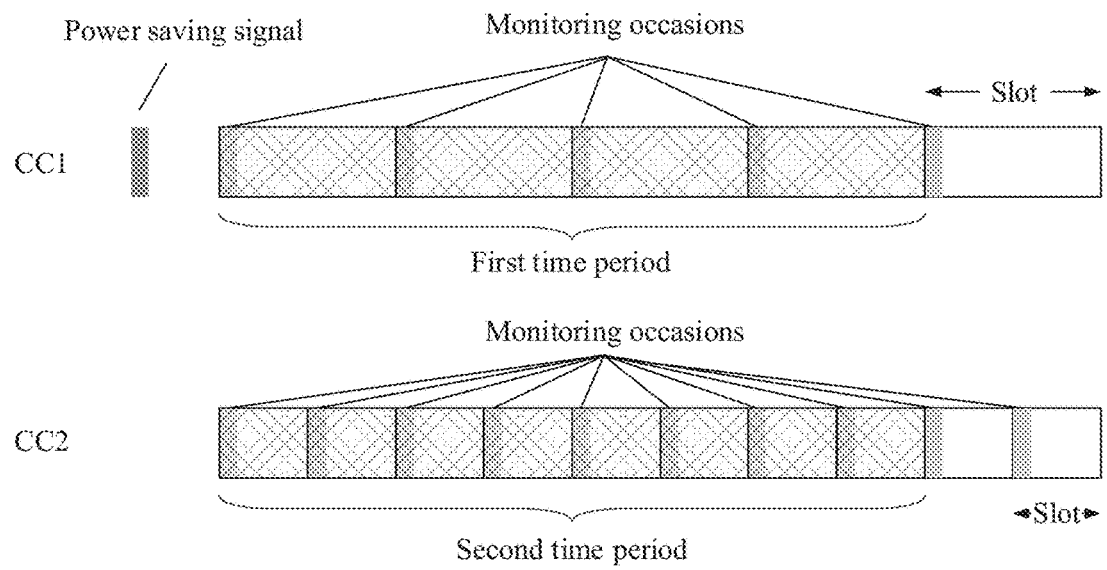
FIG. 4 to FIG. 13 are schematic diagrams of a first time period and a second time period according to an embodiment of this application.

For example, if a sub-carrier spacing of CC1 is 15 kHz, namely. M1=0, and a sub-carrier spacing of CC2 is 30 kHz, namely, M2=1, the terminal monitors the PDCCH once in each slot on CC1 and CC2. If the power saving signal indicates the terminal not to receive the PDCCH in the next four slots, the terminal determines that duration of the first time period is four slots on CC1, and determines that the duration of the second time period is $N*2^{M2-M1}=4*2^{1-0}=8$ slots on CC2, as shown in FIG. 4. The terminal no longer monitors the PDCCH on CC1 in the first time period, and no longer monitors the PDCCH on CC2 in the second time period.

Figure 5:
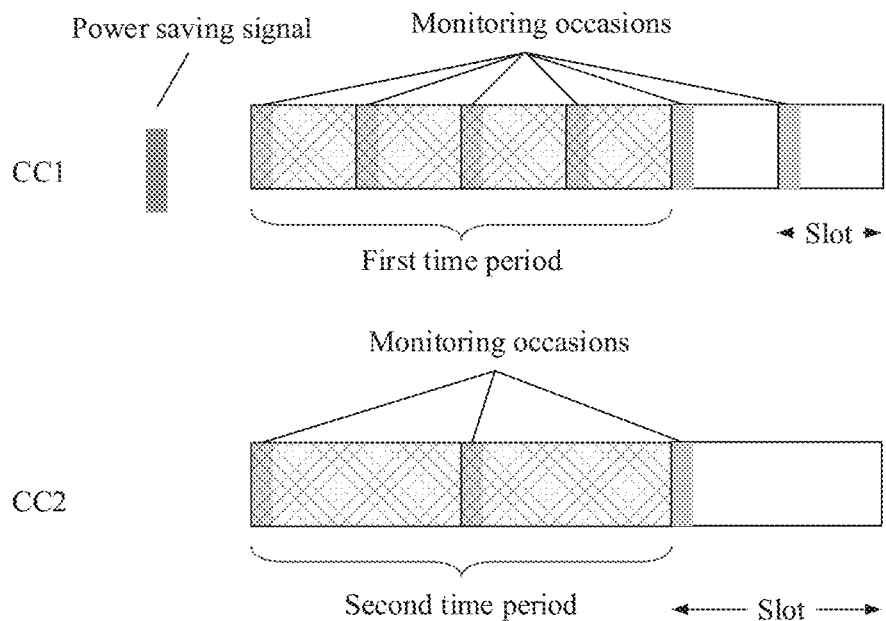

For another example, if the sub-carrier spacing of CC1 is 30 kHz, namely, M1=1, and the sub-carrier spacing of CC2 is 15 kHz, namely. M2=0, the terminal monitors the PDCCH once in each slot on CC1 and CC2. If the power saving signal indicates the terminal not to receive the PDCCH in the next four slots, namely, to enter the sleep state, the terminal determines that the duration of the first time period is four slots on CC1, and the duration of the second time period is $N*2^{M2-M1}=4*2^{0-1}=2$ slots on CC2, as shown in FIG. 5.

In the foregoing embodiment, if M2≥M1, the second time period is an integer quantity of slots; and if M2<M1, the second time period is a non-integer quantity of slots. Because the non-integer quantity of slots increases complexity for execution of the terminal, the network device may use a smaller sub-carrier spacing as a reference sub-carrier spacing, to be specific, use a frequency domain of a resource with a small sub-carrier spacing as the first frequency domain resource, so that M2≥M1, and it is ensured that the second time period is an integer quantity of slots.

99 In another design, values of M1 and M2 may be not limited. When calculating the second time period, the terminal may add a rounding operation. To be specific, the duration of the second time period is $\lfloor N*2^{M2-M1} \rfloor$ slots or $\lceil N*2^{M2-M1} \rceil$ slots on the second frequency domain resource, so that the duration of the second time period is an integer quantity of slots.

Figure 6:
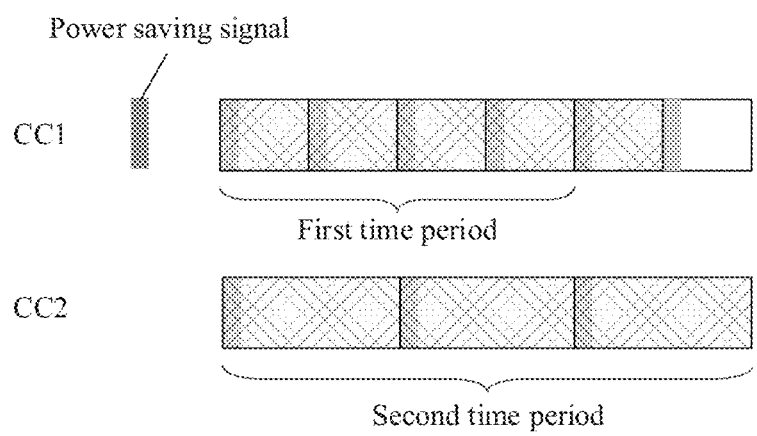
Figure 7:
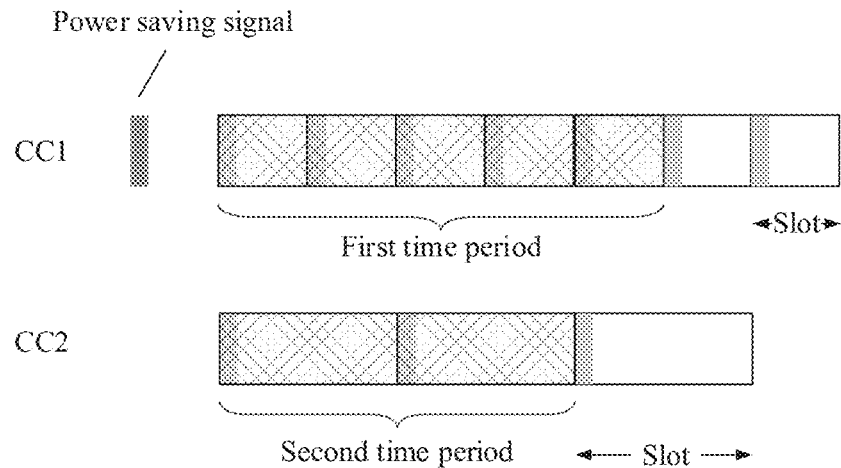

For example, if the sub-carrier spacing of CC1 is 30 kHz, namely. M1=1, and the sub-carrier spacing of CC2 is 15 kHz, namely. M2=0, the terminal monitors the PDCCH once in each slot on CC1 and CC2. If the power saving signal indicates the terminal not to receive the PDCCH in the next five slots, namely, to enter the sleep state, the terminal determines that the duration of the first time period is five slots on CC1, and the duration of the second time period is $\lceil N*2^{M2-M1} \rceil = \lceil 5*2^{0-1} \rceil = 3$ slots on CC2, as shown in FIG. 6; or the terminal determines that the duration of the second time period is $\lfloor N*2^{M2-M1} \rfloor = \lfloor 5*2^{0-1} \rfloor = 2$ slots on CC2, as shown in FIG. 7.

Alternatively, the terminal may further report an error to the network device when determining a non-integer quantity of slots. Because the terminal does not expect the first time period and/or the second time period corresponding to the N slots indicated by the network device to be a non-integer quantity of slots, the terminal may not perform an operation of entering the wake-up state or entering the sleep state indicated by the power saving signal when determining that the first time period or the second time period or both are a non-integer quantity of slots, and reports an error to the network device. On the other hand, if the network device learns, based on a pre-agreement or communication with the terminal device, that the terminal does not expect the first time period and/or the second time period to be a non-integer quantity of slots, before sending the power saving signal, the network device may first determine the duration of the first time period and the second time period based on the sub-carrier spacing of the first frequency domain resource and the sub-carrier spacing of the second frequency domain resource, so that both the first time period and the second time period are values of N of an integer quantity of slots.

It should be understood that, although the non-integer quantity of slots increases complexity for operation of the terminal, it is not impossible for the terminal to implement. Therefore, if the first time period or the second time period or both are a non-integer quantity of slots, the terminal may perform no rounding operation or report no error, but perform a sleep or wake-up operation based on the non-integer quantity of slots.

Figure 8A:
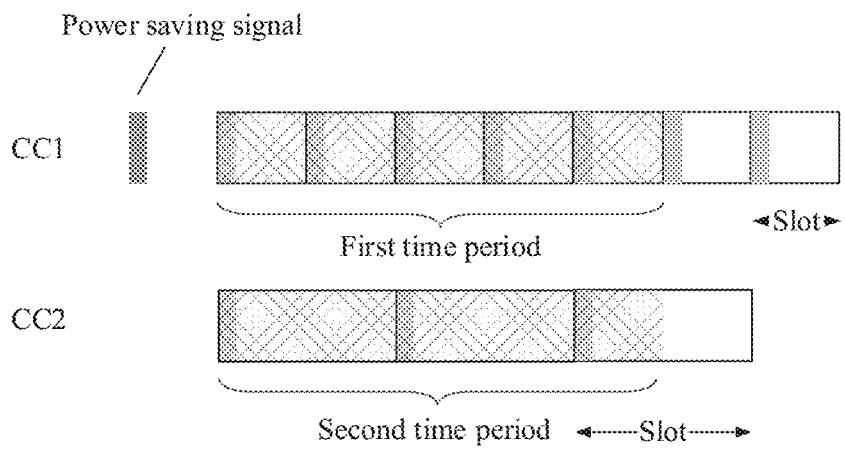

For example, if the sub-carrier spacing of CC1 is 30 kHz, namely, M1=1, and the sub-carrier spacing of CC2 is 15 kHz, namely. M2=0, the terminal monitors the PDCCH once in each slot on CC1 and CC2. If the power saving signal indicates the terminal not to receive the PDCCH in the next five slots, namely, to enter the sleep state, the terminal determines that the duration of the first time period is five slots on CC1, and the duration of the second time period is $N*2^{M2-M1}=2.5$ slots on CC2, as shown in FIG. 8a.

Optionally, the terminal may determine the duration of the second time period through table lookup based on the sub-carrier spacing of the first frequency domain resource, the sub-carrier spacing of the second frequency domain resource, and N. For example, if the sub-carrier spacing configured for the first frequency domain resource is $15*2^{M1}$ kHz, and the sub-carrier spacing configured for the second frequency domain resource is $15*2^{M2}$ kHz, a duration correspondence table of the second time period shown in Table 1 is preconfigured in the terminal.

TABLE 1

| M1 | M2 | N | X (indicating that the duration of the second time period is X slots on the second frequency domain resource) |
|---|---|---|---|
| 0 | 1 | 1 | 2 |
| 0 | 1 | 2 | 4 |
| ... | ... | ... | ... |
| 0 | 2 | 1 | 4 |
| 0 | 2 | 2 | 8 |
| ... | ... | ... | ... |

It should be understood that, the values shown in Table 1 are merely examples, and do not constitute a limitation on this application.

Further, the duration X of the second time period in Table 1 may be determined based on the formula in the foregoing embodiment.

In another possible implementation, the network device may not use the sub-carrier spacing configured for the first frequency domain resource or the sub-carrier spacing configured for the second frequency domain resource as a reference sub-carrier spacing. Before sending the power saving signal to the terminal, the network device may send first configuration information to the terminal, where the first configuration information includes a reference sub-carrier spacing of the power saving signal.

Correspondingly, the terminal determines the duration of the first time period based on the reference sub-carrier spacing, the sub-carrier spacing configured for the first frequency domain resource, and N, and determines the duration of the second time period based on the reference sub-carrier spacing, the sub-carrier spacing configured for the second frequency domain resource, and N.

Optionally, the terminal may further calculate the duration of the first time period based on the reference sub-carrier spacing, the sub-carrier spacing of the first frequency domain resource, and N, and calculate the duration of the second time period based on the reference sub-carrier spacing, the sub-carrier spacing of the second frequency domain resource, and N.

For example, if the reference sub-carrier spacing is 15*2M0 kHz, the subcarrier spacing configured for the first frequency domain resource is 15*2M1 kHz, and the sub-carrier spacing configured for the second frequency domain resource is 15*2M2 kHz, where M0, M1, and M2 are integers greater than or equal to 0, the terminal determines that the first time period is N*2M1−M0 slots on the first frequency domain resource, and that the duration of the second time period is N*2M2−M0 slots on the second frequency domain resource.

If M1≥M0 and M2≥M0, the first time period and the second time period are an integer quantity of slots; and if M1<M0 and M2<M0, the first time period and the second time period are a non-integer quantity of slots.

As described above, the terminal may not expect the first time period and/or the second time period to be a non-integer quantity of slots. In some embodiments, the reference sub-carrier spacing may be made to be smaller than or equal to the sub-carrier spacing of the first frequency domain resource, and the reference sub-carrier spacing may be made to be smaller than the second frequency domain resource, namely, M1≥M0, and M2≥M0, to ensure that the first time period and the second time period are an integer quantity of slots.

In some other embodiments, values of M0, M1, and M2 may be not limited. When calculating the first time period and the second time period, the terminal may add a rounding operation. In other words, the duration of the first time period is $\lfloor N*2^{M1-M0} \rfloor$ slots or $\lceil N*2^{M1-M0} \rceil$ slots on the first frequency domain resource; and the duration of the second time period is $\lfloor N*2^{M2-M0} \rfloor$ slots or $\lceil N*2^{M2-M0} \rceil$ slots on the second frequency domain resource.

In some other embodiments, the terminal may report an error to the network device when determining that the first time period or the second tune period or both are a non-integer quantity of slots.

On the other hand, if the network device learns, based on a pre-agreement or communication with the terminal device, that the terminal does not expect the first time period and/or the second time period to be a non-integer quantity of slots, before sending the power saving signal, the network device may first determine the duration of the first time period and the second time period based on the reference sub-carrier spacing, the sub-carrier spacing of the first frequency domain resource, and the sub-carrier spacing of the second frequency domain resource, so that both the first time period and the second time period are values of N of an integer quantity of slots.

Certainly, the terminal may further perform a sleep or wake-up operation based on the non-integer quantity of slots.

Optionally, the terminal may determine the duration of the first time period through table lookup based on the reference sub-carrier spacing, the sub-carrier spacing of the first frequency domain resource, and N, and determine the duration of the second time period through table lookup based on the reference sub-carrier spacing, the sub-carrier spacing of the second frequency domain resource, and N.

For example, assuming that the reference sub-carrier spacing is 15*2M0 kHz, and the sub-carrier spacing configured for the first frequency domain resource is 15*2M1 kHz, the terminal may determine the duration of the first time period based on Table 2.

TABLE 2

| M0 | M1 | N | X (indicating that the duration of the first time period is X slots on the first frequency domain resource) |
|---|---|---|---|
| 0 | 1 | 1 | 2 |
| 0 | 1 | 2 | 4 |
| ... | ... | ... | ... |
| 0 | 2 | 1 | 4 |
| 0 | 2 | 2 | 8 |
| ... | ... | ... | ... |

The values shown in Table 2 are merely examples, and do not constitute a limitation on this application. Further, the duration X of the first time period in Table 2 may be determined based on the formula in the foregoing embodiment.

A manner for determining the duration of the second time period by the terminal is similar to the manner for determining the duration of the first time period by the terminal. Details are not described herein again.

Generally, slots included in the first time period and the second time period are consecutive slots.

In another embodiment, the N time units are N monitoring occasions.

As shown in FIG. 4, a monitoring cycle configured for the terminal is one slot, and the PDCCH is monitored on the first symbol in each slot, namely, shadow parts in FIG. 4, where each shadow part is referred to as one monitoring occasion. As shown in FIG. 8a, every two slots on CC include one monitoring occasion, to be specific, a monitoring cycle configured for the terminal on CC1 is two slots, and every four slots on CC2 include one monitoring occasion, to be specific, a monitoring cycle configured for the terminal on CC2 is four slots.

The monitoring occasion is not an absolute time unit, and lengths of N monitoring cycles corresponding to N monitoring occasions are associated with both the monitoring cycle and the sub-carrier spacing. Therefore, when determining the value of N, the network device needs to consider sizes of the monitoring cycle and the sub-carrier spacing. If the sleep signal sent by the network device indicates N monitoring occasions, it indicates that the PDCCH is not monitored in N monitoring cycles in a case of a reference monitoring cycle and a reference sub-carrier spacing. If the wake-up signal sent by the network device indicates N monitoring occasions, it indicates that the terminal monitors the PDCCH in N monitoring cycles based on the configuration parameter in a case of the reference monitoring cycle and the reference sub-carrier spacing, to be specific, the terminal monitors the PDCCH at the monitoring occasion of each of the N monitoring cycles.

In a possible implementation, the sub-carrier spacing configured for the first frequency domain resource may be used as a reference sub-carrier spacing, and a monitoring cycle configured for the terminal on the first frequency domain resource may be used as a reference monitoring cycle. Therefore, N monitoring occasions indicated by the network device are N monitoring occasions of the terminal on the first frequency domain resource. Therefore, the terminal may directly determine, based on the power saving signal, whether to monitor or not to monitor the PDCCH on the N monitoring occasions on the first frequency domain resource. In other words, the first time period is the N monitoring cycles on the first frequency domain resource.

The terminal may determine duration of the second time period based on the sub-carrier spacing configured for the first frequency domain resource, the monitoring cycle on the first frequency domain resource, the sub-carrier spacing configured for the second frequency domain resource, a monitoring cycle on the second frequency domain resource, and N.

Optionally, the terminal may further calculate the duration of the second time period based on the sub-carrier spacing of the first frequency domain resource, the monitoring cycle on the first frequency domain resource, the sub-carrier spacing of the second frequency domain resource, the monitoring cycle on the second frequency domain resource, and N. For example, if the sub-carrier spacing of the first frequency domain resource is 15*2M1 kHz, the sub-carrier spacing of the second frequency domain resource is 15*2M2 kHz, a monitoring cycle of the terminal on the first frequency domain resource is L1 slots, and a monitoring cycle of the terminal on the second frequency domain resource is L2 slots, where M1 and M2 are integers greater than or equal to 0, and L1 and L2 are integers greater than or equal to 1, the terminal determines that the duration of the second time period is $$\frac{N*L1*2^{M2-M1}}{L2}$$

monitoring cycles on the second frequency domain resource.

Figure 9:
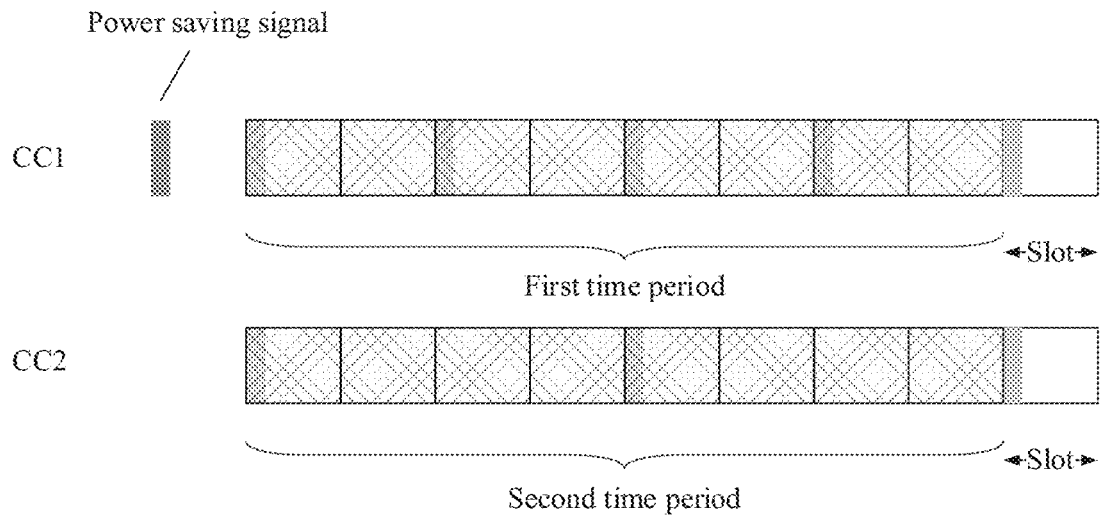

For example, if the sub-carrier spacings of CC1 and CC2 are both 15 kHz, namely, M1=M2=0, the terminal monitors the PDCCH once in every two slots on CC1, and monitors the PDCCH once in every four slots on CC2. If the power saving signal indicates the terminal not to receive the PDCCH in the next four monitoring occasions, the terminal determines that duration of the first time period is four monitoring cycles corresponding to four monitoring occasions on CC1, namely, eight slots, and determines that the duration of the second time period is two monitoring cycles corresponding to $$\frac{N*L1*2^{M2-M1}}{L2} = \frac{4*2*2^{1-1}}{4} = 2$$

monitoring occasions on CC2, namely, eight slots, as shown in FIG. 9.

Figure 10:
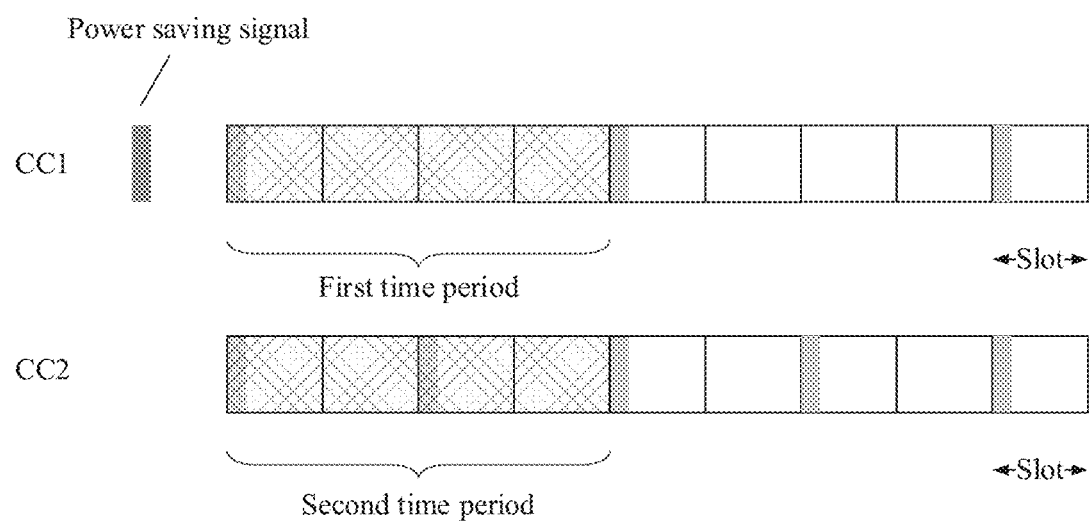

For another example, if the sub-carrier spacings of CC1 and CC2 are both 15 kHz, namely. M1=M2=0, the terminal monitors the PDCCH once in every four slots on CC1, and monitors the PDCCH once in every two slots on CC2. If the power saving signal indicates the terminal not to receive the PDCCH in the next one monitoring occasion, the terminal determines that the duration of the first time period is one monitoring cycle corresponding to the monitoring occasion on CC1, namely, four slots, and determines that the duration of the second time period is two monitoring cycles corresponding to $$\frac{N*L1*2^{M2-M1}}{L2} = \frac{1*4*2^{1-1}}{4} = 2$$

monitoring occasions on CC2, namely, four slots, as shown in FIG. 10.

The terminal may not expect the determined second time period to be a non-integer quantity of monitoring cycles. Optionally, the terminal may further add a rounding operation when calculating the second time period. To be specific, the duration of the second time period is $$\left\lfloor \frac{N*L1*2^{M2-M1}}{L2} \right\rfloor$$

monitoring cycles or $$\left\lceil \frac{N*L1*2^{M2-M1}}{L2} \right\rceil$$

monitoring cycles on the second frequency domain resource, so that the duration of the second time period is an integer quantity of monitoring cycles.

Figure 11:
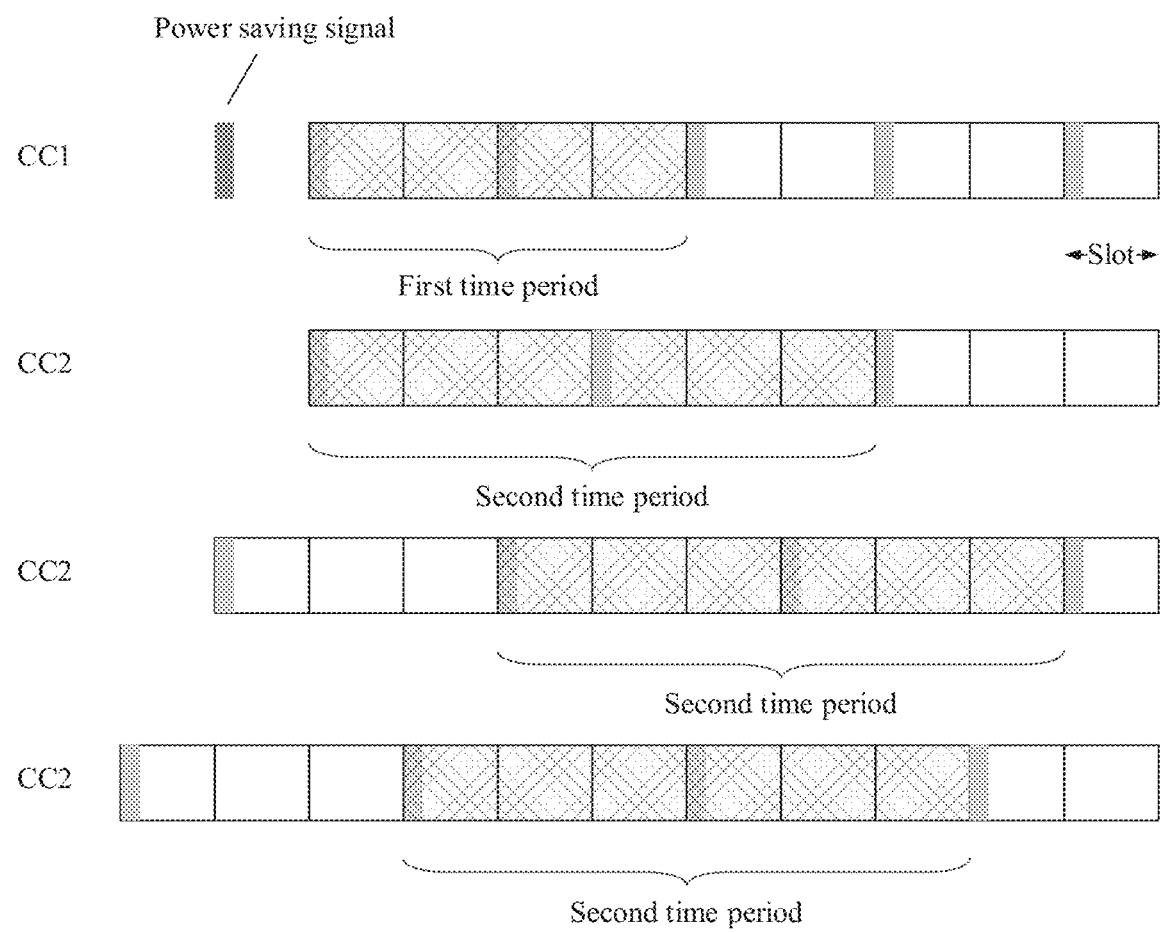

For example, if the sub-carrier spacings of CC1 and CC2 are both 15 kHz, namely, M1=M2=0, the terminal monitors the PDCCH once in every two slots on CC1, and monitors the PDCCH once in every three slots on CC2. If the power saving signal indicates the terminal not to receive the PDCCH in the next two monitoring occasions, the terminal determines that the duration of the first time period is two monitoring cycles corresponding to two monitoring occasions on CC1, namely, four slots, and determines that the duration of the second time period is two monitoring cycles corresponding to $$\left\lceil \frac{N*L1*2^{M2-M1}}{L2} \right\rceil = \left\lceil \frac{2*2*2^{1-1}}{3} \right\rceil = 2$$

monitoring occasions on CC2, namely, six slots. As shown in FIG. 11, because monitoring cycles of CC2 and CC1 are different, after the power saving signal is received, there may be three cases for the first monitoring occasion of CC2 and the first monitoring occasion of CC1: The first monitoring occasion of CC2 may be consistent with the first monitoring occasion of CC1, as CC2 shown in the second row in FIG. 10; or the first monitoring occasion of CC2 is two slots later than the monitoring occasion of CC1, as CC2 shown in the third row in FIG. 11; or the first monitoring occasion of CC2 is one slot later than the monitoring occasion of CC1, as CC2 shown in the fourth row in FIG. 11.

Figure 12:
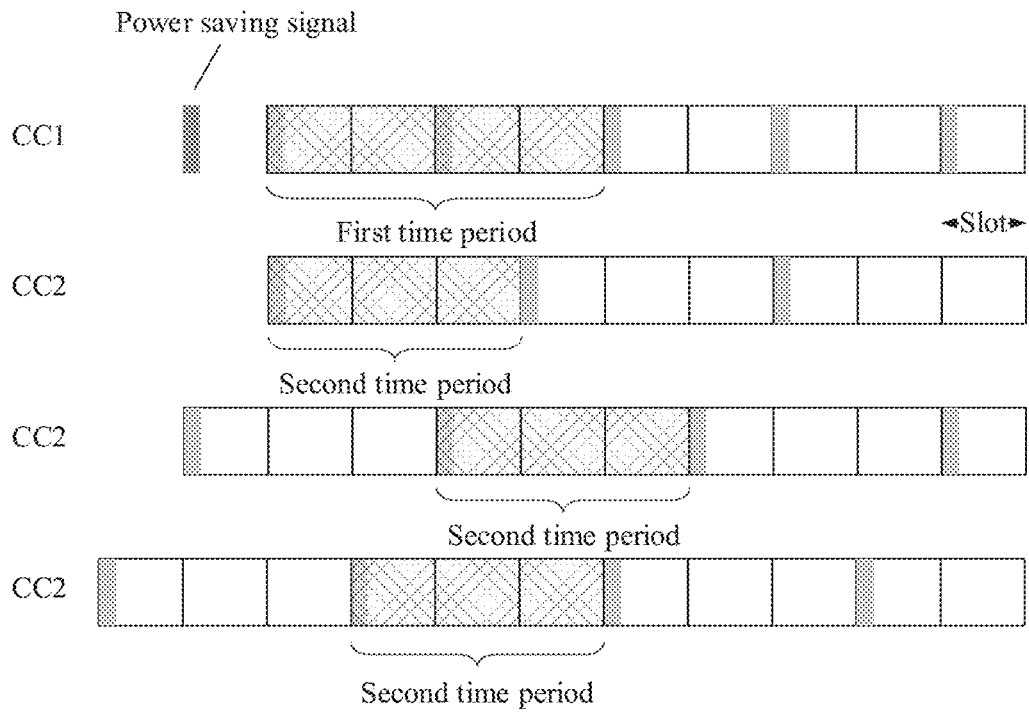

Alternatively, the terminal determines that the duration of the second time period is one monitoring cycle corresponding to $$\left\lfloor \frac{N*L1*2^{M2-M1}}{L2} \right\rfloor = \left\lfloor \frac{2*2*2^{1-1}}{3} \right\rfloor = 1$$

monitoring occasion on CC2, namely, three slots. As shown in FIG. 12, because monitoring cycles of CC2 and CC1 are different, after the power saving signal is received, there may be three cases for the first monitoring occasion of CC2 and the first monitoring occasion of CC1: The first monitoring occasion of CC2 may be consistent with the first monitoring occasion of CC1, as CC2 shown in the second row in FIG. 12, or the first monitoring occasion of CC2 is two slots later than the monitoring occasion of CC1, as CC2 shown in the third row in FIG. 12; or the first monitoring occasion of CC2 is one slot later than the monitoring occasion of CC1, as CC2 shown in the fourth row in FIG. 12.

In addition, if the terminal does not expect the second time period to be a non-integer quantity of monitoring cycles, the terminal may further report an error to the network device when determining a non-integer quantity of monitoring cycles. On the other hand, if the network device learns, based on a pre-agreement or communication with the terminal device, that the terminal does not expect the first time period and/or the second time period to be a non-integer quantity of monitoring cycles, before sending the power saving signal, the network device may first determine the duration of the first time period and the second time period based on the sub-carrier spacing and the monitoring cycle of the first frequency domain resource, and the sub-carrier spacing and the monitoring cycle of the second frequency domain resource, so that both the first time period and the second time period are values of N of an integer quantity of slots.

In the manners for determining the duration of the first time period and the duration of the second time period by the terminal, an example in which units of the duration of the first time period and the duration of the second time period are monitoring cycles are used for description. However, the terminal may further determine a quantity of slots included in the first time period and a quantity of slots included in the second time period. For example, the terminal determines that the duration of the first time period is N*L1 slots on the first frequency domain resource, and that the duration of the second tune period is N*L1*2$^{M2-M1}$ slots, or $$L2*\left\lfloor \frac{N*L1*2^{M2-M1}}{L2} \right\rfloor$$

slots, or $$L2*\left\lceil \frac{N*L1*2^{M2-M1}}{L2} \right\rceil$$

slots on the second frequency domain resource.

Figure 13:
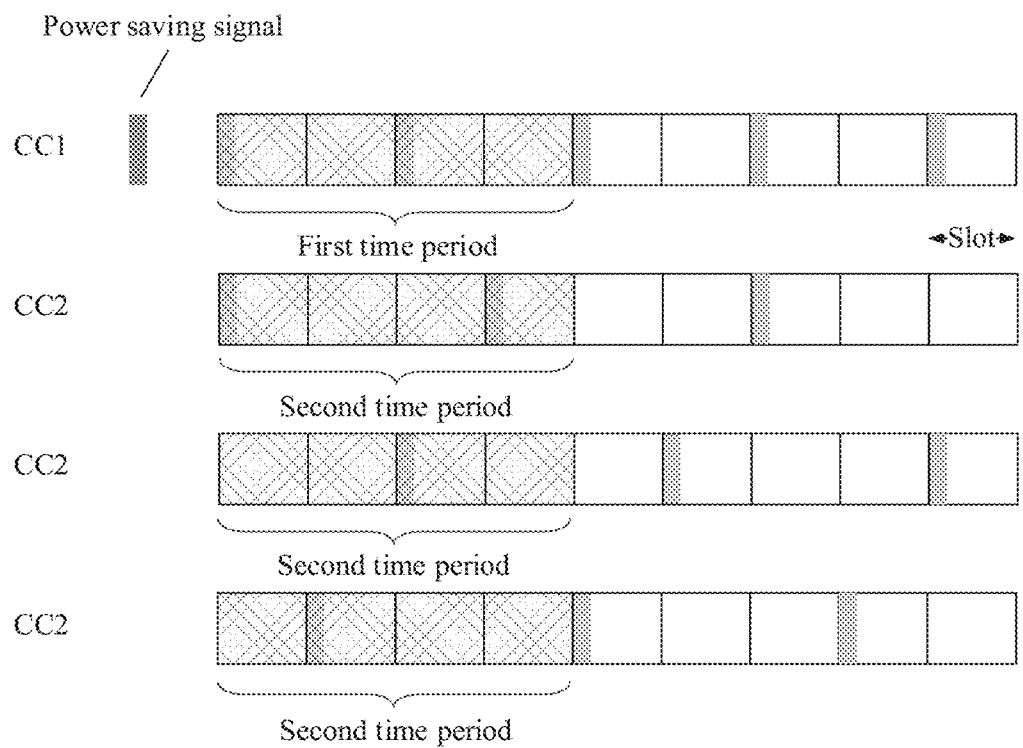

For example, if the sub-carrier spacings of CC1 and CC2 are both 15 kHz, namely. M1=M2=0, the terminal monitors the PDCCH once in every two slots on CC1, and monitors the PDCCH once in every three slots on CC2. If the power saving signal indicates the terminal not to receive the PDCCH in the next two monitoring occasions, the terminal determines that the duration of the first time period is N*L1=2*2=4 slots on CC1, and determines that the duration of the second time period is N*L1*2$^{M2-M1}$=2*2*2$^{1-1}$=4 slots on CC2. As shown in FIG. 13, because monitoring cycles of CC2 and CC1 are different, after the power saving signal is received, there may be three cases for the first monitoring occasion of CC2 and the first monitoring occasion of CC1: The first monitoring occasion of CC2 may be consistent with the first monitoring occasion of CC1, as CC2 shown in the second row in FIG. 13, where the second time period includes two monitoring occasions; or the first monitoring occasion of CC2 is two slots later than the monitoring occasion of CC1, as CC2 shown in the third row in FIG. 13, where the second time period includes one monitoring occasion: or the first monitoring occasion of CC2 is one slot later than the monitoring occasion of CC1, as CC2 shown in the fourth row in FIG. 13, where the second time period includes one monitoring occasion.

In the foregoing embodiment in which a slot is used as a unit, when no rounding operation is performed, if M2≥M1, the second time period is an integer quantity of slots; and if M2<M1, the second time period is a non-integer quantity of slots. Because the terminal may not expect a non-integer quantity of slots, a smaller sub-carrier spacing may be used as a reference sub-carrier spacing, to be specific, a frequency domain of a resource with a small sub-carrier spacing is used as the first frequency domain resource, so that M2≥M1.

It should be understood that, although a non-integer quantity of monitoring cycles or a non-integer quantity of slots increases complexity for operation of the terminal, it is not impossible for the terminal to implement. Therefore, if the first time period or the second time period or both are a non-integer quantity of monitoring cycles or a non-integer quantity of slots, the terminal may perform no rounding operation or report no error, but perform a sleep or wake-up operation based on the non-integer quantity of slots.

Optionally, the terminal may determine the duration of the second time period through table lookup based on the sub-carrier spacing of the first frequency domain resource, the monitoring cycle on the first frequency domain resource, the sub-carrier spacing of the second frequency domain resource, the monitoring cycle on the second frequency domain resource, and N. For example, if the sub-carrier spacing of the first frequency domain resource is 15*2M1 kHz, the sub-carrier spacing of the second frequency domain resource is 15*2M2 kHz, the monitoring cycle of the terminal on the first frequency domain resource is L1 slots, and the monitoring cycle of the terminal on the second frequency domain resource is L2 slots, where M1 and M2 are integers greater than or equal to 0, and L1 and L2 are integers greater than or equal to 1, the terminal may determine the duration of the second time period based on Table 3.

TABLE 3

| M1 | L1 | M2 | L2 | N | Y (indicating that the duration of the second time period is Y monitoring cycles on the second frequency domain resource) |
|---|---|---|---|---|---|
| 0 | 1 | 1 | 2 | 1 | 1 |
| 0 | 1 | 1 | 2 | 2 | 2 |
| ... | ... | ... | ... | ... | ... |
| 0 | 1 | 2 | 4 | 1 | 1 |
| 0 | 1 | 2 | 4 | 1 | 2 |
| ... | ... | ... | ... | ... | ... |

It should be understood that, the values shown in Table 3 are merely examples, and do not constitute a limitation on this application.

In another possible implementation, the network device may not use the sub-carrier spacing of the first frequency domain resource as the reference sub-carrier spacing, or use the monitoring cycle of the terminal on the first frequency domain resource as the reference monitoring cycle. Before sending the power saving signal to the terminal, the network device may send second configuration information to the terminal, where the second configuration information includes a reference sub-carrier spacing and a reference monitoring cycle of the power saving signal.

Correspondingly, the terminal determines the duration of the first time period based on the reference sub-carrier spacing, the reference monitoring cycle, the sub-carrier spacing of the first frequency domain resource, the monitoring cycle of the terminal on the first frequency domain resource, and N; and determines the duration of the second time period based on the reference sub-carrier spacing, the reference monitoring cycle, the sub-carrier spacing of the second frequency domain resource, the monitoring cycle of the terminal on the second frequency domain resource, and N.

Optionally, the terminal may further calculate the duration of the first time period based on the reference sub-carrier spacing, the reference monitoring cycle, the sub-carrier spacing of the first frequency domain resource, the monitoring cycle on the first frequency domain resource, and N; and calculates the duration of the second time period based on the reference sub-carrier spacing, the reference monitoring cycle, the sub-carrier spacing of the second frequency domain resource, the monitoring cycle on the second frequency domain resource, and N.

For example, if the reference sub-carrier spacing is $15*2^{M0}$ kHz, the reference monitoring cycle is L0 slots, the sub-carrier spacing configured for the first frequency domain resource is $15*2^{M1}$ kHz, and the monitoring cycle of the terminal on the first frequency domain resource is L1 slots, where M0 and M1 are integers greater than or equal to 0, and L0 and L1 are integers greater than or equal to 1, the terminal determines that the duration of the first time period is $$\frac{N*L0*2^{M1-M0}}{L1}$$

monitoring cycles, or $$\left\lfloor \frac{N*L0*2^{M1-M0}}{L1} \right\rfloor$$

monitoring cycles, or $$\left\lceil \frac{N*L0*2^{M1-M0}}{L1} \right\rceil$$

monitoring cycles, or $N*L0*2^{M1-M0}$ slots, or $$L1*\left\lfloor \frac{N*L0*2^{M1-M0}}{L1} \right\rfloor$$

slots, or $$L1*\left\lceil \frac{N*L0*2^{M1-M0}}{L1} \right\rceil$$

slots on the first frequency domain resource; or that the duration of the second time period is $$\frac{N*L0*2^{M2-M0}}{L2}$$

monitoring cycles, or $$\left\lfloor \frac{N*L0*2^{M2-M0}}{L2} \right\rfloor$$

monitoring cycles, or $$\left\lceil \frac{N*L0*2^{M2-M0}}{L2} \right\rceil$$

monitoring cycles, or $N*L0*2^{M2-M0}$ slots, or $L2*$ $$\left\lfloor \frac{N*L0*2^{M2-M0}}{L2} \right\rfloor$$

slots, or $$L2*\left\lceil \frac{N*L0*2^{M2-M0}}{L2} \right\rceil$$

slots on the second frequency domain resource.

If M1≥M0 and M2≥M0, the first time period and the second time period are an integer quantity of slots; and if M1<M0 and M2<M0, the first time period and the second time period are a non-integer quantity of slots. As described above, the terminal may not expect the first time period and/or the second time period to be a non-integer quantity of slots. In some embodiments, the reference sub-carrier spacing may be made to be smaller than or equal to the sub-carrier spacing of the first frequency domain resource, and the reference sub-carrier spacing may be made to be smaller than the second frequency domain resource, namely, M1≥M0, and M2≥M0, to ensure that the first time period and the second time period are an integer quantity of slots.

Alternatively, the terminal may further report an error to the network device when determining that the first time period or the second time period is or both are a non-integer quantity of monitoring cycles or a non-integer quantity of slots. On the other hand, if the network device learns, based on a pre-agreement or communication with the terminal device, that the terminal does not expect the first time period and/or the second time period to be a non-integer quantity of monitoring cycles or a non-integer quantity of slots, before sending the power saving signal, the network device may first determine the duration of the first time period and the second time period based on the reference sub-carrier spacing, the reference monitoring cycle, the sub-carrier spacing of the first frequency domain resource, the monitoring cycle on the first frequency domain resource, the sub-carrier spacing of the second frequency domain resource, and the monitoring cycle on the second frequency domain resource, so that both the first time period and the second time period are values of N of an integer quantity of monitoring cycles, or both the first time period and the second time period are values of N of a non-integer quantity of slots.

Certainly, the terminal may further perform a sleep or wake-up operation based on the non-integer quantity of monitoring cycles or the non-integer quantity of slots.

Optionally, the terminal may determine the duration of the first time period and the duration of the second time period through table lookup based on the foregoing information. For example, assuming that the reference sub-carrier spacing is 15*2M0 kHz, the reference monitoring cycle is L0 slots, the sub-carrier spacing configured for the first frequency domain resource is 15*2M1 kHz, and a monitoring cycle of the terminal on the first frequency domain resource is L1 slots, where M0 and M1 are integers greater than or equal to 0, and L0 and L1 are integers greater than or equal to 1, the terminal may determine, based on Table 4, that the duration of the first time period is W monitoring cycles, or determine, based on Table 5, that the duration of the first time period is Z slots.

TABLE 4

| M0 | L0 | M1 | L1 | N | W (indicating that the duration of the first time period is W monitoring cycles on the first frequency domain resource) |
|---|---|---|---|---|---|
| 0 | 1 | 1 | 2 | 1 | 1 |
| 0 | 1 | 1 | 2 | 2 | 2 |
| ... | ... | ... | ... | ... | ... |
| 0 | 1 | 2 | 4 | 1 | 1 |
| 0 | 1 | 2 | 4 | 2 | 2 |
| ... | ... | ... | ... | ... | ... |

TABLE 5

| M0 | L0 | M1 | LI | N | Z (indicating that the duration of the first time period is Z slots on the first frequency domain resource) |
|---|---|---|---|---|---|
| 0 | 1 | 1 | 2 | 1 | 2 |
| 0 | 1 | 1 | 2 | 2 | 4 |

TABLE 5-continued

| M0 | L0 | M1 | LI | N | Z (indicating that the duration of the first time period is Z slots on the first frequency domain resource) |
|---|---|---|---|---|---|
| ... | ... | ... | ... | ... | ... |
| 0 | 1 | 2 | 4 | 1 | 4 |
| 0 | 1 | 2 | 4 | 2 | 8 |
| ... | ... | ... | ... | ... | ... |

It should be understood that, the values shown in Table 4 and Table 5 are merely examples, and do not constitute a limitation on this application.

A manner for determining the duration of the second time period by the terminal is similar to the manner for determining the duration of the first time period by the terminal. Details are not described herein again.

Generally, slots included in the first time period and the second time period are consecutive slots.

In still another embodiment, the N time units are N C-DRX cycles.

Figure 14:
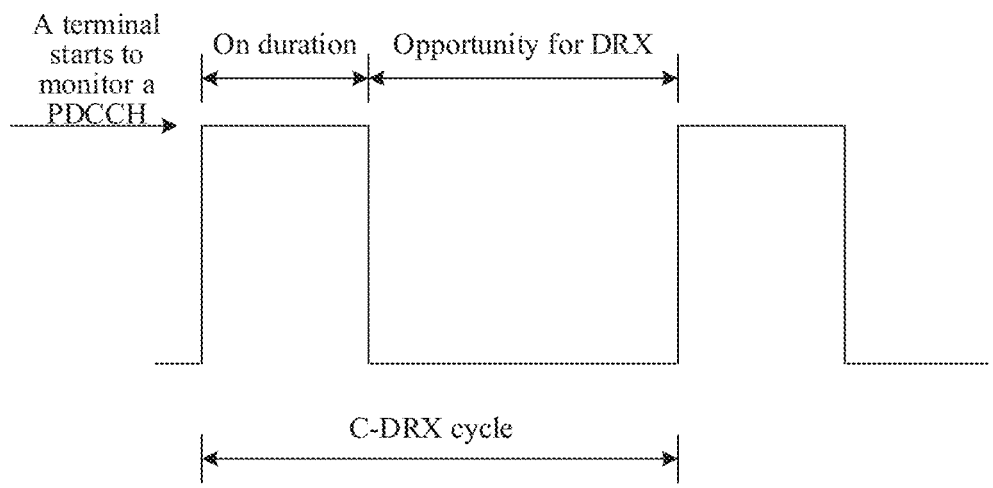
FIG. 14 is a schematic diagram of C-DRX according to an embodiment of this application.

A concept of C-DRX is defined in both LTE and NR. Specifically, a terminal in an RRC-connected mode (RRC_connected) may be configured with a C-DRX cycle (C-DRX cycle). As shown in FIG. 14, the C-DRX cycle includes an on duration (on duration) and an opportunity for DRX (opportunity for DRX). In the on duration, the terminal monitors and receives the PDCCH. In the opportunity for DRX, the UE does not receive the PDCCH to reduce power consumption. A size of the C-DRX cycle and lengths of the on duration and the opportunity for DRX may be configured for the terminal by the network device.

When the network device configures the C-DRX cycle for the terminal, in a CA scenario, different C-DRX parameters may be configured for different CCs: and in a BWP scenario, different C-DRX parameters may be configured for different BWPs. In other words, C-DRX cycles may be different on different CCs or different BWPs.

In this embodiment of this application, after configuring C-DRX parameters for the terminal on different frequency domain resources, the network device may further send a power saving signal to the terminal based on a requirement. The power saving signal sent by the network device may be indicated as N C-DRX cycles.

Because lengths of the N C-DRX cycles are related to a length of one C-DRX cycle, when determining a value of N, the network device needs to consider the length of one C-DRX cycle, namely, determines the value of N based on a reference C-DRX cycle.

In a possible implementation, a C-DRX cycle on the first frequency domain resource may be used as the reference C-DRX cycle. Therefore, N C-DRX cycles indicated by the network device are N C-DRX cycles on the first frequency domain resource. Therefore, the terminal may directly determine that the first time period is the N C-DRX cycles on the first frequency domain resource.

The terminal may determine duration of the second time period based on the C-DRX cycle on the first frequency domain resource, a C-DRX cycle on the second frequency domain resource, and N.

Optionally, the terminal may further calculate the duration of the second time period based on the C-DRX cycle of the first frequency domain resource, the C-DRX cycle of the second frequency domain resource, and N. For example, if the C-DRX cycle on the first frequency domain resource is K1 absolute time units, and the C-DRX cycle on the second frequency domain resource is K2 absolute time units, where K1 and K2 are integers greater than or equal to 1, the terminal determines that the duration of the second time period is N*K1/K2 C-DRX cycles on the second frequency domain resource.

In the manners for determining duration of the first time period and the duration of the second time period by the terminal, an example in which units of the duration of the first time period and the duration of the second time period are C-DRX cycles is used for description. In addition, the terminal may further determine a quantity of absolute time units included in the first time period and the second time period. For example, the terminal determines that both the duration of the first time period and the duration of the second time period are N*K1 absolute time units.

Optionally, the terminal may determine the duration of the second time period through table lookup based on the C-DRX cycle on the first frequency domain resource, the C-DRX cycle on the second frequency domain resource, and N. For example, if the C-DRX cycle on the first frequency domain resource is K1 absolute time units, and the C-DRX cycle on the second frequency domain resource is K2 absolute time units, where the absolute time unit may be millisecond (ms), second (s), or the like, and K1 and K2 are integers greater than or equal to 1, the terminal may determine the duration of the second time period based on Table 6 or Table 7.

TABLE 6

| K1 | K2 | N | A (indicating that the duration of the second time period is A C-DRX cycles on the second frequency domain resource) |
|---|---|---|---|
| 80 | 160 | 1 | 0.5 |
| 80 | 160 | 2 | 1 |
| ... | ... | ... | ... |
| 160 | 320 | 1 | 0.5 |
| 160 | 320 | 2 | 1 |
| ... | ... | ... | ... |

It should be understood that, the values shown in Table 6 are merely examples, and do not constitute a limitation on this application.

In another possible implementation, the network device may not use the C-DRX cycle on the first frequency domain resource as the reference C-DRX cycle. Before sending the power saving signal to the terminal, the network device may send third configuration information to the terminal, where the third configuration information indicates that a reference C-DRX cycle is K0 absolute time units.

Correspondingly, the terminal determines the duration of the first time period based on the reference C-DRX cycle, the C-DRX cycle on the first frequency domain resource, and N, and determines the duration of the second time period based on the reference C-DRX cycle, the C-DRX cycle on the second frequency domain resource, and N.

Optionally, the terminal may further calculate the duration of the first time period based on the reference C-DRX cycle, the C-DRX cycle on the first frequency domain resource, and N; and calculate the duration of the second time period based on the reference C-DRX cycle, the C-DRX cycle on the second frequency domain resource, and N.

For example, if the reference C-DRX cycle is K0 absolute time units, the C-DRX cycle of the first frequency domain resource is K1 absolute time units, and the C-DRX cycle on the second frequency domain resource is K2 absolute time units, where K0, K1, and K2 are integers greater than or equal to 1, the terminal determines that the duration of the first time period is N*K0/K1 C-DRX cycles on the first frequency domain resource, and that the duration of the second time period is N*K0/K2 C-DRX cycles on the second frequency domain resource, or the terminal may determine that both the duration of the first time period and the duration of the second time period are N*K0 absolute time units.

In some embodiments, the terminal may not expect the duration of the first time period and the second time period to be a non-integer quantity of C-DRX cycles. Therefore, if the terminal determines that the duration of the first time period and/or the second time period is a non-integer quantity of C-DRX cycles, the terminal may report an error to the network device. On the other hand, if the network device learns, based on a pre-agreement or communication with the terminal device, the terminal does not expect the first time period and/or the second time period to be a non-integer quantity of C-DRX cycles, before sending the power saving signal, the network device may first determine the duration of the first time period and the second time period based on the reference C-DRX cycle, the C-DRX cycle on the first frequency domain resource, and the C-DRX cycle on the second frequency domain resource, so that both the first time period and the second time period are values of N of an integer quantity of C-DRX cycles.

Optionally, the terminal may determine the duration of the first time period through table lookup based on the reference C-DRX cycle, the C-DRX cycle on the first frequency domain resource, and N. For example, assuming that the reference C-DRX cycle is K0 absolute time units, and the C-DRX cycle on the first frequency domain resource is K1 absolute time units, the terminal may determine, based on Table 7, that the duration of the first time period is B C-DRX cycles, or determine, based on Table 8, that the duration of the first tune period is C absolute time units.

TABLE 7

| K0 | K1 | N | B (indicating that the duration of the first time period is B C-DRX cycles on the first frequency domain resource) |
|---|---|---|---|
| 80 | 160 | 1 | 0.5 |
| 80 | 160 | 2 | 1 |
| ... | ... | ... | ... |
| 160 | 320 | 1 | 0.5 |
| 160 | 320 | 2 | 1 |
| ... | ... | ... | ... |

TABLE 8

| K0(ms) | K1(ms) | N | C(ms) |
|---|---|---|---|
| 80 | 160 | 1 | 80 |
| 80 | 160 | 2 | 160 |
| ... | ... | ... | ... |
| 160 | 320 | 1 | 80 |
| 160 | 320 | 2 | 160 |
| ... | ... | ... | ... |

It should be understood that, the values shown in Table 7 and Table 8 are merely examples, and do not constitute a limitation on this application.

A manner for determining the duration of the second time period by the terminal is similar to the manner for determining the duration of the first time period by the terminal. Details are not described herein again.

The foregoing separately describes manners for determining the duration of the first time period and the second time period in three cases. When the terminal performs asleep or wake-up operation based on the power sa-Ong signal and the network device determines whether to send a first signal to the terminal, a start time of the first time period and a start time of the second time period need to be further determined. Specifically, the start time of the first time period and the start time of the second time period may be determined in the following four manners:

Manner 1:

The terminal may use the first slot on the first frequency domain resource after the power saving signal is received as the start time of the first time period, and use the first slot on the second frequency domain resource after the power saving signal is received as the start time of the second time period. For the network device, the first slot on the first frequency domain resource after the power saving signal is sent may be used as the start time of the first time period, and the first slot on the second frequency domain resource after the power saving signal is sent may be used as the start time of the second time period, as shown in FIG. 4 to FIG. 7.

Figure 15:
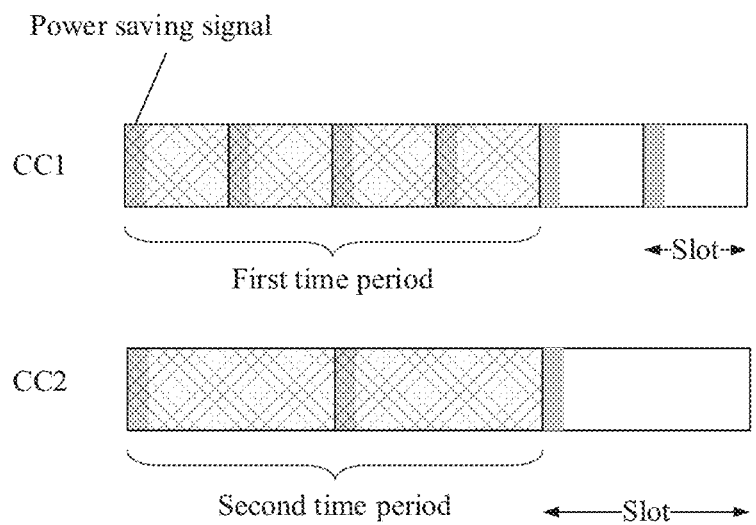
FIG. 15 is a schematic diagram of a first time period and a second time period according to an embodiment of this application.

Alternatively, the terminal may use a slot in which the power saving signal is received as the start time of the first time period and the start time of the second time period. Correspondingly, the network device uses a slot in which the power saving signal is sent as the start time of the first time period and the start time of the second time period, as shown in FIG. 15.

Manner 1 for determining the start time of the first time period and the start time of the second time period is applicable to the foregoing case 1, case 2, and case 3.

Manner 2:

When the N time units indicated by the power saving signal are N monitoring occasions, the terminal may use the first monitoring occasion on the first frequency domain resource after the power saving signal is received as the start time of the first time period, and use the first monitoring occasion on the second frequency domain resource after the power saving signal is received as the start time of the second time period. For the network device, the first monitoring occasion on the first frequency domain resource after the power saving signal is sent may be used as the start time of the first time period, and the first monitoring occasion on the second frequency domain resource after the power saving signal is sent may be used as the start time of the second time period, as shown in FIG. 9 to FIG. 12.

Manner 3:

When the N time units indicated by the power saving signal are N C-DRX cycles, the terminal may use a start time of a next C-DRX on the first frequency domain resource after the power saving signal is received as the start time of the first time period, and use a start time of a next C-DRX on the second frequency domain resource after the power saving signal is received as the start time of the second time period. For the network device, a start time of a next C-DRX on the first frequency domain resource after the power saving signal is sent may be used as the start time of the first time period, and a start time of a next C-DRX on the second frequency domain resource after the power saving signal is sent may be used as the start time of the second time period.

The start time of the C-DRX may be a start time of one C-DRX cycle, or may be a start time of an on duration in one C-DRX cycle.

Manner 4:

As described above, the power saving signal may be carried in DCI signaling and sent to the terminal. The DCI that carries the power saving signal may be DCI dedicated to the power saving signal, or the DCI carries both the power saving signal and scheduling information that is used to schedule uplink data or downlink data. When the power saving signal and the scheduling information are multiplexed in the same DCI, the terminal and the network device first complete transmission of uplink data or downlink data based on the scheduling information, and then the terminal enters the sleep state.

Figure 16:
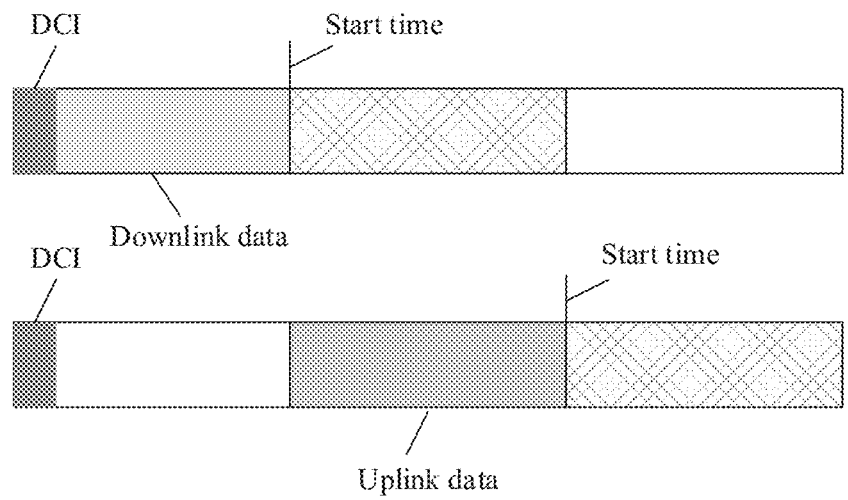
FIG. 16 to FIG. 18 are schematic diagrams of a start time of a first time period or a second time period according to an embodiment of this application.

In a possible implementation, if the DCI includes the power saving signal and scheduling information of downlink data (or uplink data), the terminal first receives, based on the DCI, the downlink data sent by the network device (or sends uplink data to the network device), and then enters the sleep state. In this case, the terminal may use the first symbol or the first slot after the last symbol of the downlink data (or uplink data) as the start time of the first time period (and/or the second time period), as shown in FIG. 16.

Figure 17:
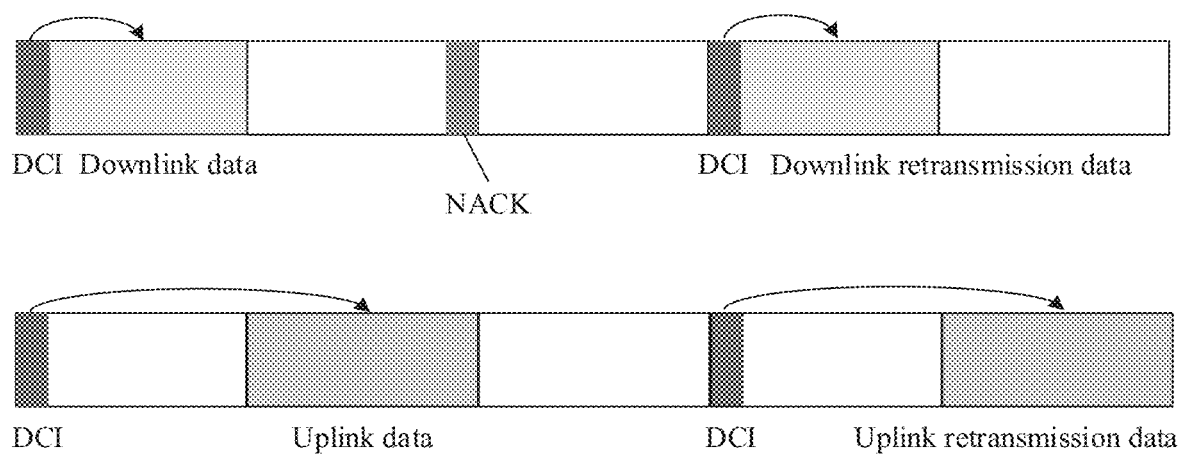

In another possible implementation, when the network device communicates with the terminal, a hybrid automatic repeat request (hybrid automatic repeat request, HARQ) mechanism may be introduced. After receiving the downlink data, the terminal returns an acknowledgement/negative acknowledgement (ACK/NACK) to the network device, to indicate whether the terminal has successfully received the downlink data. If the terminal fails to receive the downlink data, the network device may resend the scheduling information and resend the downlink data. After the terminal sends the uplink data to the network device, if the network device fails to receive the uplink data, the terminal may resend the scheduling information to the terminal, so that the terminal resends the uplink data, as shown in FIG. 17.

If the DCI schedules the downlink data, the terminal may use a slot in which the power saving signal (DCI) is received as the start time of the first time period; or may use the first symbol or the first slot after the terminal receives the last symbol of the downlink data as the start time of the first time period: or may use the first symbol or the first slot after the terminal sends the ACK/NACK as the start time of the first time period; or may wait for preset duration after sending the ACK/NACK, and if the terminal does not receive the scheduling information of the network device within the preset duration, retransmission does not need to be performed, and then the terminal starts to enter the sleep state.

Figure 18:
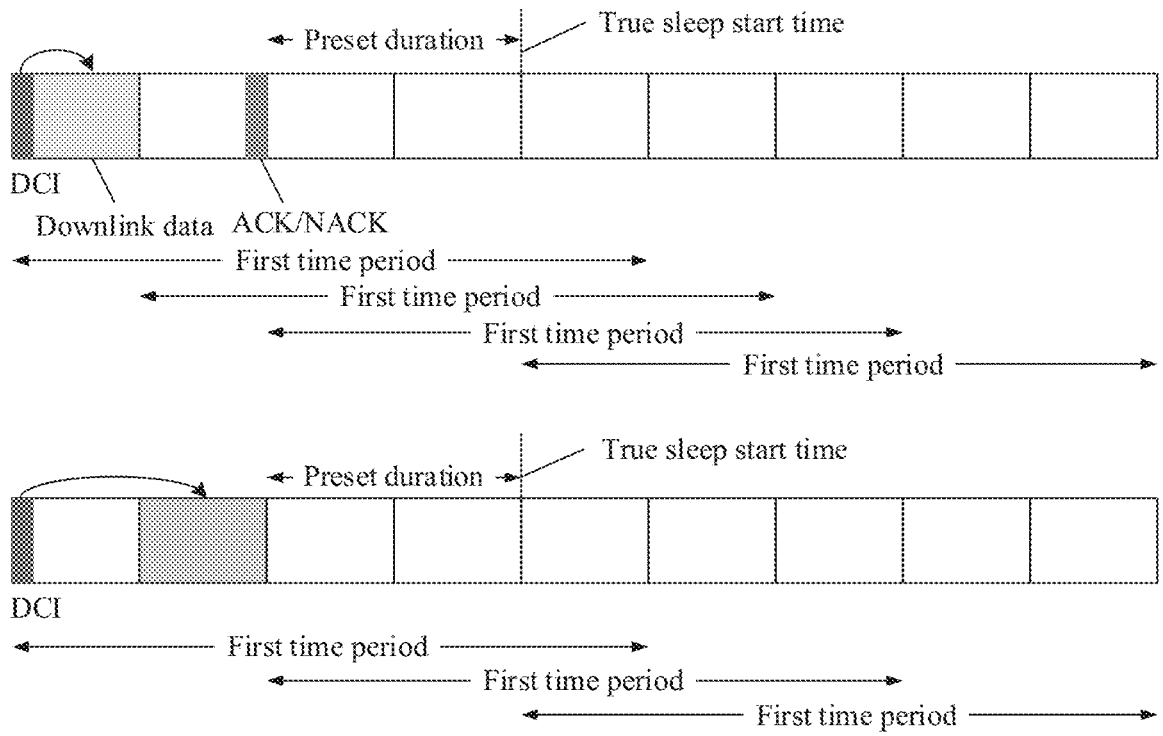

Specifically, if the terminal uses a slot in which the power saving signal (DCI) is received as the start time of the first time period, the terminal further needs to receive the downlink data based on the DCI and feed back the ACK/NACK, and before actually entering the sleep state, the terminal waits for a period of preset duration to determine that retransmission is not performed. For example, as shown in FIG. 18, the terminal receives DCI in slot 0. The DCI includes scheduling information of downlink data and a power saving signal, and indicates the terminal to receive the downlink data in slot 0 and enter the sleep state in the next five slots. The terminal determines that slot 0 is the start time of the first time period, and the duration of the first time period is five slots (that is, slot 0 to slot 4). The terminal receives the downlink data in slot 0, and feeds back the ACK/NACK in slot 1. Assuming that the preset duration is two slots, if the terminal does not receive, in two slots (namely, slot 2 and slot 3) after the ACK/NACK is fed back, the scheduling information sent by the network device, the terminal starts to enter the sleep state from slot 4.

If the terminal uses the first symbol or the first slot after the last symbol of the downlink data is received as the start time of the first time period, the terminal needs to feed back an ACK/NACK and wait for a period of preset duration before actually entering the sleep state. For example, as shown in FIG. 18, the terminal receives DCI in slot 0. The DCI includes scheduling information of downlink data and a power saving signal, and indicates the terminal to receive the downlink data in slot 0 and enter the sleep state in the next five slots. The terminal determines that slot 1 is the start time of the first time period, and the duration of the first time period is five slots (namely, slot 1 to slot 5). The terminal feeds back an ACK/NACK in slot 1, and it is assumed that the preset duration is two slots. If the terminal does not receive, m two slots (namely, slot 2 and slot 3) after the ACK/NACK is fed back, the scheduling information sent by the network device, the terminal starts to enter the sleep state from slot 4. In other words, the terminal is in the sleep state in slot 4 and slot 5.

If the terminal uses the first symbol or the first slot after the ACK/NACK is sent as the start time of the first time period, the terminal further needs to wait for preset duration, and can actually enter the sleep state when the network device does not resend the scheduling information. For example, as shown in FIG. 18, the terminal receives DCI in slot 0, receives the downlink data in slot 0, and feeds back the ACK/NACK in slot 1. The terminal may use slot 2 as the start time of the first time period, and it is assumed that the preset duration is two slots. If the terminal does not receive, in two slots (namely, slot 2 and slot 3) after the ACK/NACK is fed back, the scheduling information sent by the network device, the terminal starts to enter the sleep state from slot 4. In other words, the terminal is in the sleep state from slot 4 to slot 6.

If the terminal starts timing of the first time period after feeding back the ACK/NACK and waiting for the preset duration, the first time period is a time period in which the terminal actually enters the sleep state. For example, as shown in FIG. 18, the terminal receives DCI in slot 0. The DCI includes scheduling information of downlink data and a power saving signal, and indicates the terminal to receive the downlink data in slot 0 and enter the sleep state in the next five slots. The terminal receives the downlink data in slot 0, and feeds back the ACK/NACK in slot 1. It is assumed that the preset duration is two slots. If the terminal does not receive, in two slots (that is, slot 2 and slot 3) after the ACK/NACK is fed back, the scheduling information sent by the network device, slot 4 is used as the start time of the first time period. In other words, the terminal is in the sleep state in slot 4 to slot 8.

On the other hand, if the DCI schedules the uplink data, the terminal may use a slot in winch the power saving signal (DCI) is received as the start time of the first time period, or may use the first symbol or the first slot after the terminal sends the last symbol of the uplink data as the start time of the first time period: or may wait for preset duration after sending the uplink data, and if the terminal does not receive the scheduling information of the network device within the preset duration, retransmission does not need to be performed, and then the terminal starts to enter the sleep state. This is similar to the case in which the DCI schedules the downlink data. Details are not described herein again.

The preset duration may be configured for the terminal by the network device.

Manner 5:

The start time of the first time period may be determined in any one of Manner 1 to Manner 4, and the start time of the second time period is the same as the start time of the first time period.

Figure 8B:
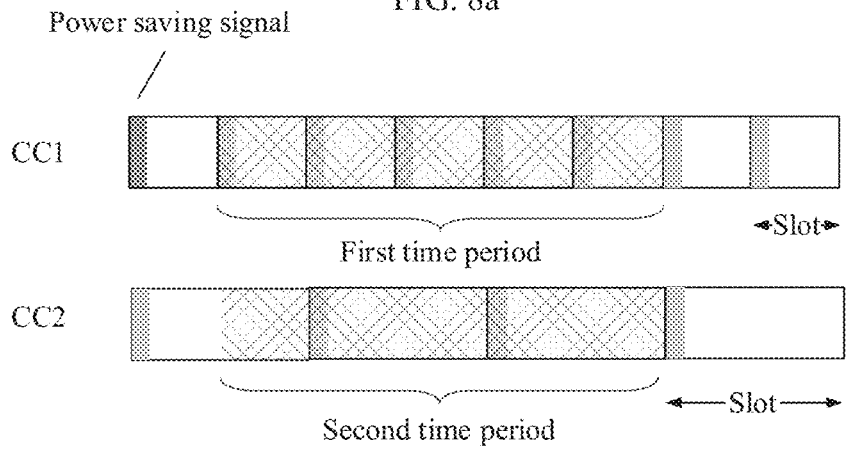

For example, as shown in FIG. 8b, the terminal determines that the start time of the first time period is the first slot or the first monitoring occasion on CC1 after the power saving signal is received, and the terminal uses the start time of the first time period as the start time of the second time period. In this case, the terminal is located m a middle position of one slot on CC2, and the position is not a monitoring occasion.

No manner which manner is used to determine the start time of the first time period and the start time of the second time period, the terminal and the network device need to determine the start time in the same manner based on a pre-agreement or communication between the terminal and the network device.

In the foregoing embodiment, after receiving the power saving signal, the terminal determines a time period corresponding to the N time units indicated by the signal on different frequency domain resources, instead of simply determining that sleep time or wake-up time on different frequency domain resources are the N time units. Because states of the terminal on different frequency domain resources are closely synchronized, this helps save power.

Based on the same technical concept, an embodiment of this application further provides a communications method, including:

A network device sends a power saving signal to a terminal, where the power saving signal indicates N time units, and N is an integer greater than 0. The terminal determines a state of the terminal in a first time period corresponding to the N time units on a first frequency domain resource and a state in a second time period corresponding to the N time units on a second frequency domain resource. The state of the terminal includes a sleep state and a wake-up state, the sleep state indicates that the terminal performs no measurement, and the wake-up state indicates that the terminal performs measurement based on a configuration parameter.

For example, the terminal receives a CSI-RS sent by the network device, then performs channel state measurement based on the CSI-RS, and feeds back a measurement result to a base station based on configuration or indication information of the network device, so that the base station optimizes data scheduling of the terminal based on the measurement result. If the terminal receives the power saving signal sent by the network device, and indicates the terminal to enter the sleep state, the terminal determines to no longer perform channel state measurement in the first time period on the first frequency domain resource, and determines to no longer perform channel state measurement in the second time period on the second frequency domain resource.

Optionally, that the terminal no longer performs measurement after entering the sleep state may mean that the terminal does not receive the CSI-RS, or may mean that the terminal receives the CSI-RS but does not process the CSI-RS.

Methods for determining the duration and the start time of the first time period, and the duration and the start time of the second time period are similar to those in the foregoing embodiment. Details are not described herein again.

Figure 19:
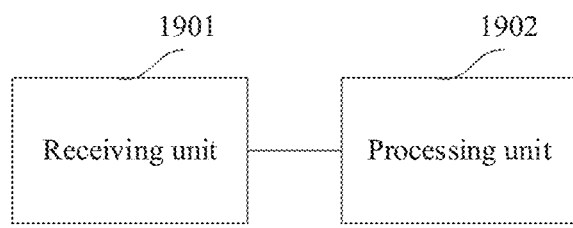
FIG. 19 is a first schematic structural diagram of a terminal according to an embodiment of this application.

Based on the same technical concept, an embodiment of this application further provides a terminal, configured to implement functions performed by the terminal in the foregoing method embodiments. As shown m FIG. 19, the terminal may include a receiving unit 1901 and a processing unit 1902. The receiving unit 1901 is configured to receive a power saving signal and monitor a first signal in the foregoing method embodiments, and the processing unit 1902 is configured to perform other functions of the terminal in the foregoing method embodiments.

Figure 20:
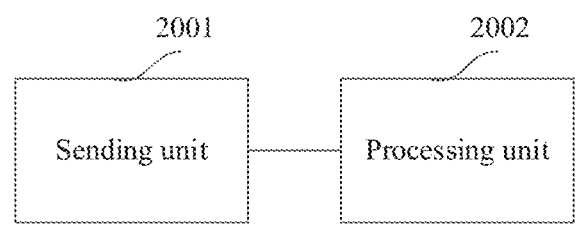
FIG. 20 is a first schematic structural diagram of a network device according to an embodiment of this application.

Based on the same technical concept, an embodiment of this application further provides a network device, configured to implement functions performed by the network device in the foregoing method embodiments. As shown in FIG. 20, the terminal may include a sending unit 2001 and a processing unit 2002. The sending unit 2001 is configured to send a power saving signal and send a first signal in the foregoing method embodiments, and the processing unit 2002 is configured to perform other functions of the network device in the foregoing method embodiments.

It should be noted that the foregoing unit division is merely logical function division, and may be all or partially integrated into one physical entity during actual implementation, or may be physically separated. These units may all be implemented in a form of calling software by a processing element; or may all be implemented in a form of hardware. Alternatively, some units may be implemented in a form of calling software by a processing element, and some units may be implemented in a form of hardware. For example, the receiving unit and the processing unit may be integrated together, or may be implemented independently. The processing element may be an integrated circuit and has a signal processing capability. In an implementation process, steps in the foregoing methods or the foregoing units can be implemented by using a hardware integrated logical circuit in the processing element, or by using instructions in a form of software. In addition, the sending unit is a sending control unit, and may send information by using a sending apparatus, for example, an antenna or a radio frequency apparatus. Similarly, the receiving unit may also receive information by using a receiving apparatus, for example, an antenna and a radio frequency apparatus.

The foregoing units may be one or more integrated circuits configured to implement the foregoing method, for example, one or more application specific integrated circuits (application specific integrated circuits, ASICs), one or more microprocessors, or one or more field programmable gate arrays (field programmable gate arrays, FPGAs). For another example, when the foregoing unit is implemented in a form of scheduling a program by a processing element, the processing element may be a general-purpose processor, for example, a central processing unit (central processing unit CPU) or another processor that can invoke a program. For another example, these units may be integrated together and implemented in a form of a system-on-a-chip (system-on-a-chip, SOC).

Figure 21:
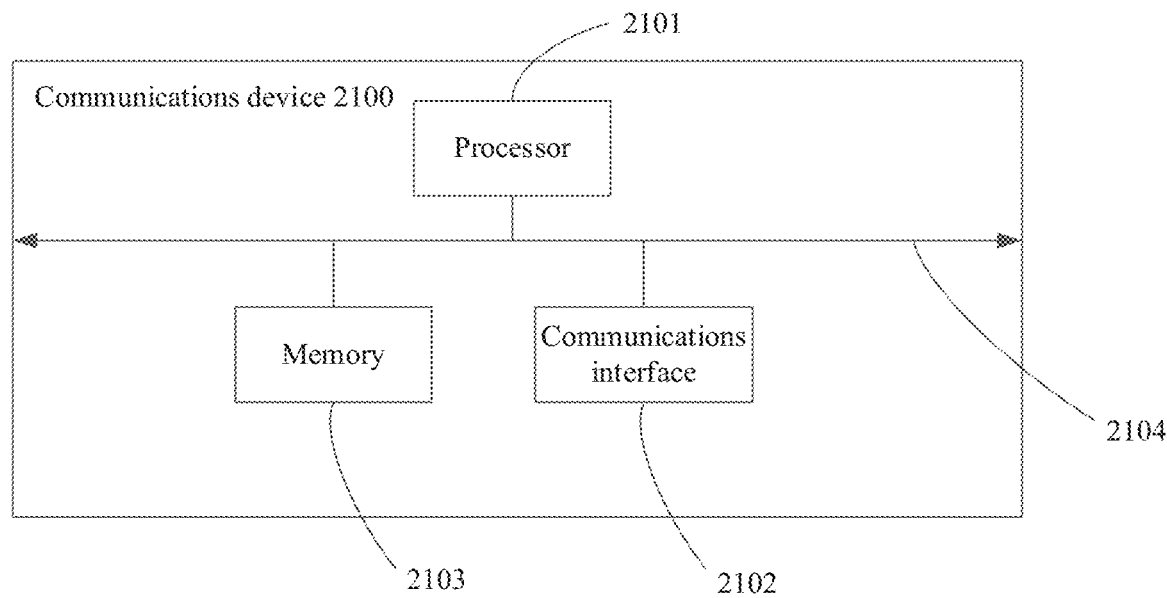
FIG. 21 is a second schematic structural diagram of a terminal according to an embodiment of this application.

Based on the same technical concept, an embodiment of this application further provides a communications device, configured to implement functions of the terminal in the foregoing method embodiments. As shown in FIG. 21, the communications device 2100 may include a processor 2101 and a communications interface 2102. Further, the communications device 2100 may further include a memory 2103 and a communications bus 2104.

Specifically, the processor 2101 may be a general-purpose CPU, a microprocessor, an ASIC, or one or more integrated circuits configured to control program execution of the solutions in this application.

The communications interface 2102 uses any apparatus such as a transceiver, and is configured to communicate with another device or a communications network, for example, an Ethernet, a radio access network (radio access network. RAN), or a wireless local area network (wireless local area network, WLAN).

The communications bus 2104 may include a channel for transmitting information between the foregoing components.

The memory 2103 may be a read-only memory (read-only memory, ROM) or another type of static storage device that can store static information and instructions, a random access memory (random access memory. RAM) or another type of dynamic storage device that can store information and instructions, an electrically erasable programmable read-only memory (electrically erasable programmable read-only memory EEPROM), or any other medium that can be configured to carry or store desired program code in a form of an instruction or a data structure and that can be accessed by a computer, but is not limited thereto. The memory 2103 may exist independently, for example, may be an off-chip memory, and is connected to the processor 2101 by using the communications bus 2104. The memory 2103 may also be integrated with the processor 2101.

The communications interface 2102 is responsible for communicating with another device or a communications network, and the processor 2101 is configured to implement other functions in the communications method provided in the foregoing embodiments of this application.

In specific implementation, in an embodiment, the processor 2101 may include one or more CPUs.

In specific implementation, in an embodiment, the terminal may include a plurality of processors. Each of these processors may be a single-core (single-CPU) processor, or may be a multi-core (multi-CPU) processor. The processor herein may be one or more devices, circuits, and/or processing cores configured to process data (for example, a computer program instruction).

Figure 22:
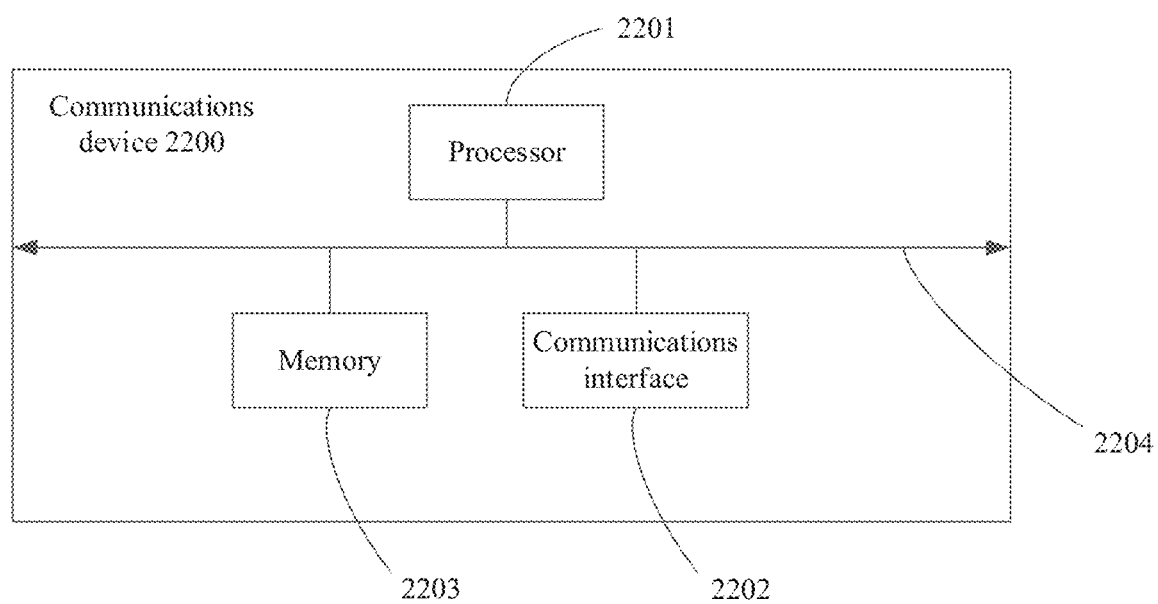
FIG. 22 is a second schematic structural diagram of a network device according to an embodiment of this application.

Based on the same technical concept, an embodiment of this application further provides a communications device, configured to implement functions of the network device in the foregoing method embodiments. As shown in FIG. 22, the communications device 2200 may include a processor 2201 and a communications interface 2202. Further, the communications device 2200 may further include a memory 2203 and a communications bus 2204.

Specifically, the processor 2201 may be a general-purpose CPU, a microprocessor, an ASIC, or one or more integrated circuits configured to control program execution of the solutions in this application.

The communications interface 2202 uses any apparatus such as a transceiver, and is configured to communicate with another device or a communications network, such as an Ethernet, a RAN, or a WLAN.

The communications bus 2204 may include a channel for transmitting information between the foregoing components.

The memory 2003 may be a read-only memory or another type of static storage device that can store static information and instructions, a random access memory or another type of dynamic storage device that can store information and instructions, an electrically erasable programmable read-only memory, or any other medium that can be configured to carry or store desired program code in a form of an instruction or a data structure and can be accessed by a computer, but is not limited thereto. The memory 2203 may exist independently, for example, may be an off-chip memory, and is connected to the processor 2204 by using the communications bus 2201. The memory 2203 may also be integrated with the processor 2201.

The communications interface 2202 is responsible for communicating with another device or a communications network, and the processor 2201 is configured to implement other functions of the communications method provided in the foregoing embodiments of this application.

In specific implementation, in an embodiment, the processor 2201 may include one or more CPUs.

In specific implementation, in an embodiment, the terminal may include a plurality of processors. Each of these processors may be a single-core processor or a multi-core processor. The processor herein may be one or more devices, circuits, and/or processing cores configured to process data (for example, a computer program instruction).

Based on the same technical concept, an embodiment of this application provides a computer-readable storage medium. The computer-readable storage medium stores a computer instruction. When the instruction is run on a computer, the computer is caused to perform functions performed by the terminal in the foregoing method embodiments.

Based on the same technical concept, an embodiment of this application provides a computer-readable storage medium. The computer-readable storage medium stores a computer instruction. When the instruction is run on a computer, the computer is caused to perform functions performed by the network device in the foregoing method embodiments.

Based on the same technical concept, an embodiment of this application provides a computer program product including an instruction. When the computer program product is run on a computer, the computer is caused to perform functions performed by the terminal in the foregoing method embodiments.

Based on the same technical concept, an embodiment of this application provides a computer program product including an instruction. When the computer program product is run on a computer, the computer is caused to perform functions performed by the network device in the foregoing method embodiments.

Based on the same technical concept, this application provides a chip. The chip is connected to a memory, and is configured to read and execute a software program stored in the memory, to implement functions performed by the terminal in the foregoing method embodiments.

Based on the same technical concept, this application provides a chip. The chip is connected to a memory, and is configured to read and execute a software program stored in the memory, to implement functions performed by the network device in the foregoing method embodiments.

In the foregoing embodiments of this application, the term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

In the embodiments of this application. "a plurality of" means two or more than two.

In addition, it should be understood that, in the description of this application, the terms such as "first" and "second" are merely used for distinguishing description, and cannot be understood as indicating or implying relative importance, or as indicating or implying a sequence. Obviously, a person skilled in the at can make various modifications and variations to this application without departing from the spirit and scope of this application. This application is intended to cover these modifications and variations of this application provided that they fall within the scope of protection defined by the following claims and their equivalent technologies.

What is claimed is:

1. A method, comprising:
   receiving a power saving signal from a network device, wherein the power saving signal indicates N time units, and wherein N is an integer greater than 0; and
   obtaining, based on the power saving signal, a first state of a terminal in a first time period corresponding to the N time units on a first frequency domain resource and a second state in a second time period corresponding to the N time units on a second frequency domain resource,
   wherein a first sub-carrier spacing of the first frequency domain resource is different than a second sub-carrier spacing of the second frequency domain resource,
   wherein the first frequency domain resource and the second frequency domain resource comprise different numbers of monitoring occasions within the N time units,
   wherein each of the first state and the second state is a sleep state or a wake-up state,
   wherein the sleep state indicates that the terminal does not monitor a first signal, and
   wherein the wake-up state indicates that the terminal monitors the first signal based on a configuration parameter.

2. The method of claim 1, wherein each of the N time units is a slot, wherein a first duration of the first time period is N slots on the first frequency domain resource, and wherein a second duration of the second time period is based on the first sub-carrier spacing configured for the first frequency domain resource, the second sub-carrier spacing configured for the second frequency domain resource, and the N time units.

3. The method of claim 2, wherein the first sub-carrier spacing is 15*2M1 kilohertz (kHz), wherein the second sub-carrier spacing is 15*2M2 kHz, wherein M1 and M2 are integers greater than or equal to 0, and wherein the second duration is N*2M2−M1 slots, $\lfloor N*2^{M2-M1} \rfloor$ slots, or $\lceil N*2^{M2-M1} \rceil$ slots on the second frequency domain resource.

4. The method of claim 1, wherein each of the time units is a slot, and wherein before receiving the power saving signal from the network device, the method further comprises:
   receiving first configuration information from the network device, wherein the first configuration information comprises a reference sub-carrier spacing of the power saving signal;
   obtaining a first duration of the first time period based on the reference sub-carrier spacing, the first sub-carrier spacing configured for the first frequency domain resource, and the N time units; and
   obtaining a second duration of the second time period based on the reference sub-carrier spacing, the second sub-carrier spacing configured for the second frequency domain resource, and the N time units.

5. The method of claim 4, wherein the reference sub-carrier spacing is 15*2M0 kilohertz (kHz), wherein the first sub-carrier spacing is 15*2M1 kHz, wherein the second sub-carrier spacing is 15*2M2 kHz, wherein the first duration is N*2M1-M0 slots, $\lfloor N*2^{M1-M0} \rfloor$ slots, or $\lceil N*2^{M1-M0} \rceil$ slots on the first frequency domain resource, and wherein the second duration is N*2M2-M0 slots, $\lfloor N*2^{M2-M0} \rfloor$ slots, or $\lceil N*2^{M2-M0} \rceil$ slots on the second frequency domain resource.

6. The method of claim 1, wherein each of the time units is a monitoring occasion, wherein a first duration of the first time period is N monitoring cycles or N*L1 slots on the first frequency domain resource, wherein L indicates that a first monitoring cycle of the terminal on the first frequency domain resource is L1 slots, wherein L1 is an integer greater than or equal to 1, and wherein a second duration of the second time period is based on the first sub-carrier spacing configured for the first frequency domain resource, the second sub-carrier spacing configured for the second frequency domain resource, the first monitoring cycle of the terminal on the first frequency domain resource, a second monitoring cycle of the terminal on the second frequency domain resource, and the N time units.

7. The method of claim 6, wherein the first sub-carrier spacing is 15*M1 kilohertz (kHz), wherein the second sub-carrier spacing is 15*2M2 kHz, wherein the second monitoring cycle is L2 slots, wherein M1 and M2 are integers greater than or equal to 0, wherein L2 is an integer greater than or equal to 1, and wherein the second duration is $$\frac{N*L1*2^{M2-M1}}{L2}$$

monitoring cycles, $$\left\lfloor \frac{N*L1*2^{M2-M1}}{L2} \right\rfloor$$

monitoring cycles, $$\left\lceil \frac{N*L1*2^{M2-M1}}{L2} \right\rceil$$

monitoring cycles, $N*L1*2^{M2-M1}$ slots, $$L2 * \left\lfloor \frac{N*L1*2^{M2-M1}}{L2} \right\rfloor$$

slots, or $$L2 * \left\lceil \frac{N*L1*2^{M2-M1}}{L2} \right\rceil$$

slots on the second frequency domain resource.

8. The method of claim 1, wherein each of the time units is a monitoring occasion, and wherein before receiving the power saving signal from the network device, the method further comprises:
  receiving second configuration information from the network device, wherein the second configuration information comprises a reference sub-carrier spacing and a reference monitoring cycle of the power saving signal;
  obtaining a first duration of the first time period based on the reference sub-carrier spacing, the first sub-carrier spacing configured for the first frequency domain resource, the reference monitoring cycle, a first monitoring cycle of the terminal on the first frequency domain resource, and the N time units; and
  obtaining a second duration of the second time period based on the reference sub-carrier spacing, the second sub-carrier spacing configured for the second frequency domain resource, the reference monitoring cycle, a second monitoring cycle of the terminal on the second frequency domain resource, and the N time units.

9. The method of claim 8, wherein the reference sub-carrier spacing is 15*2M0 kilohertz (kHz), wherein the reference monitoring cycle is L0 slots, wherein M0 is an integer greater than or equal to 0, wherein L0 is an integer greater than or equal to 1, wherein the first sub-carrier spacing is 15*2M1 kHz, wherein the second sub-carrier spacing is 15*2M2 kHz, wherein the first monitoring cycle is L1 slots, wherein the second monitoring cycle is L2 slots, wherein M1 and M2 are integers greater than or equal to 0, wherein L1 and L2 are integers greater than or equal to 1, wherein the first is $$\frac{N*L0*2^{M1-M0}}{L1}$$

monitoring cycles, $$\left\lfloor \frac{N*L0*2^{M1-M0}}{L1} \right\rfloor$$

monitoring cycles, $$\left\lceil \frac{N*L0*2^{M1-M0}}{L1} \right\rceil$$

monitoring cycles, $N*L0*2M^{1-M0}$ slots, $$L1 * \left\lfloor \frac{N*L0*2^{M1-M0}}{L1} \right\rfloor$$

slots, or $$L1 * \left\lceil \frac{N*L0*2^{M1-M0}}{L1} \right\rceil$$

slots on the first frequency domain resource, and wherein the second duration is $$\frac{N*L0*2^{M2-M0}}{L2}$$

monitoring cycles, $$\left\lfloor \frac{N*L0*2^{M2-M0}}{L2} \right\rfloor$$

monitoring cycles, $$\left\lceil \frac{N*L0*2^{M2-M0}}{L2} \right\rceil$$

monitoring cycles, $N*L0*2^{M2-M0}$ slots, $$L2*\left\lfloor \frac{N*L0*2^{M2-M0}}{L2} \right\rfloor$$

slots, or $$L2*\left\lceil \frac{N*L0*2^{M2-M0}}{L2} \right\rceil$$

slots on the second frequency domain resource.

10. The method of claim 1, wherein each of the time units is a connected-discontinuous reception (C-DRX) cycle, wherein a C-DRX cycle configured for the first frequency domain resource is K1 absolute time units, wherein K1 is an integer greater than or equal to 1, wherein a first duration of the first time period is N C-DRX cycles or N*K1 absolute time units on the first frequency domain resource, and wherein a second duration of the second time period is based on a first C-DRX cycle configured for the terminal on the first frequency domain resource, a second C-DRX cycle configured for the terminal on the second frequency domain resource, and the N time units.

11. The method of claim 1, wherein each of the time units is a connected-discontinuous reception (C-DRX) cycle, and wherein before receiving the power saving signal from the network device, the method further comprises:
  receiving third configuration information from the network device, wherein the third configuration information indicates that a reference C-DRX cycle of the power saving signal is K0 absolute time units;
  obtaining a first duration of the first time period based on the reference C-DRX cycle, a first C-DRX cycle configured for the terminal on the first frequency domain resource, and the N time units; and
  obtaining a second duration of the second time period based on the reference C-DRX cycle, a second C-DRX cycle configured for the terminal on the second frequency domain resource, and the N time units.

12. A method, comprising:
  sending a power saving signal to a terminal, wherein the power saving signal indicates N time units, wherein N is an integer greater than 0, wherein the power saving signal indicates a first state of the terminal in a first time period corresponding to the N time units on a first frequency domain resource and a second state in a second time period corresponding to the N time units on a second frequency domain resource, wherein a first sub-carrier spacing of the first frequency domain resource is different than a second sub-carrier spacing of the second frequency domain resource, wherein the first frequency domain resource and the second frequency domain resource comprise different numbers of monitoring occasions within the N time units, wherein each of the first state and the second state is a sleep state or a wake-up state, wherein the sleep state indicates that the terminal does not monitor a first signal, and wherein the wake-up state indicates that the terminal monitors the first signal based on a configuration parameter; and
  sending the first signal to the terminal or skipping sending the first signal to the terminal based on the first state or the second state.

13. The method of claim 12, wherein each of the time units is a slot, wherein a first duration of the first time period is N slots on the first frequency domain resource, and wherein a second duration of the second time period is based on the first sub-carrier spacing configured for the first frequency domain resource, the second sub-carrier spacing configured for the second frequency domain resource, and the N time units.

14. The method of claim 13, wherein the first sub-carrier spacing is 15*2M1 kilohertz (kHz), wherein the second sub-carrier spacing is 15*2M2 kHz, wherein M1 and M2 are integers greater than or equal to 0, and wherein the second duration of the second time period is N*2M2-M1 slots, $\lfloor N*2^{M2-M1} \rfloor$ slots, or $\lceil N*2^{M2-M1} \rceil$ slots on the second frequency domain resource.

15. The method of claim 12, wherein each of the time units is a slot, wherein before sending the power saving signal to the terminal, the method further comprises sending first configuration information to the terminal, wherein the first configuration information comprises a reference sub-carrier spacing of the power saving signal, wherein a first duration of the first time period is based on the reference sub-carrier spacing, the first sub-carrier spacing configured for the first frequency domain resource, and the N time units, and wherein a second duration of the second time period is based on the reference sub-carrier spacing, the second sub-carrier spacing configured for the second frequency domain resource, and the N time units.

16. The method of claim 15, wherein the reference sub-carrier spacing is 15*2M0 kilohertz (kHz), wherein the first sub-carrier spacing is 15*2M1 kHz, wherein the second sub-carrier spacing is 15*2M2 kHz, wherein the first duration of the first time period is N*2M1-M0 slots, $\lfloor N*2^{M1-M0} \rfloor$ slots, or $\lceil N*2^{M1-M0} \rceil$ slots on the first frequency domain resource, and wherein the second duration is N*2M2-M0 slots, $\lfloor N*2^{M2-M0} \rfloor$ slots, or $\lceil N*2^{M2-M0} \rceil$ slots on the second frequency domain resource.

17. An apparatus, comprising:
  a memory configured to store instructions; and
  one or more processors coupled to the memory and configured to execute the instructions to:
    receive a power saving signal from a network device, wherein the power saving signal indicates N time units, and wherein N is an integer greater than 0; and
    obtain, based on the power saving signal, a first state of the apparatus in a first time period corresponding to the N time units on a first frequency domain resource and a second state in a second time period corresponding to the N time units on a second frequency domain resource,
    wherein a first sub-carrier spacing of the first frequency domain resource is different than a second sub-carrier spacing of the second frequency domain resource,
    wherein the first frequency domain resource and the second frequency domain resource comprise different numbers of monitoring occasions within the N time units,
    wherein each of the first state and the second state is a sleep state or a wake-up state, wherein the sleep state indicates that the apparatus does not monitor a first signal, and wherein the wake-up state indicates that the apparatus monitors the first signal based on a configuration parameter.

18. The apparatus of claim 17, wherein each of the time units is a slot, wherein a first duration of the first time period is N slots on the first frequency domain resource, and wherein a second duration of the second time period is based on the first sub-carrier spacing configured for the first frequency domain resource, the second sub-carrier spacing configured for the second frequency domain resource, and the N time units.

19. The apparatus of claim 18, wherein the first sub-carrier spacing configured for the first frequency domain resource is 15*2M1 kilohertz (kHz), wherein the second sub-carrier spacing configured for the second frequency domain resource is 15*2M2 kHz, wherein M1 and M2 are integers greater than or equal to 0, and wherein the second duration of the second time period is N*2M2-M1 slots, $\lfloor N*2^{M2-M1} \rfloor$ slots, or $\lceil N*2^{M2-M1} \rceil$ slots on the second frequency domain resource.

20. The apparatus of claim 17, wherein each of the time units is a slot, and wherein the one or more processors are further configured to execute the instructions to:

receive first configuration information from the network device before the power saving signal from the network device is received, wherein the first configuration information comprises a reference sub-carrier spacing of the power saving signal;

obtain a first duration of the first time period based on the reference sub-carrier spacing, the first sub-carrier spacing configured for the first frequency domain resource, and the N time units; and obtain a second duration of the second time period based on the reference sub-carrier spacing, the second sub-carrier spacing configured for the second frequency domain resource, and the N time units.

* * * * *